(12) United States Patent
Carder et al.

(10) Patent No.: US 12,008,813 B2
(45) Date of Patent: Jun. 11, 2024

(54) PHOTO INSTRUCTIONS AND CONFIRMATION

(71) Applicant: United Parcel Service of America, Inc., Atlanta, GA (US)

(72) Inventors: David Carder, Cumming, GA (US); Ryan Fannon, Atlanta, GA (US); William McCauley, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 11 days.

(21) Appl. No.: 17/897,778

(22) Filed: Aug. 29, 2022

(65) Prior Publication Data

US 2024/0071078 A1    Feb. 29, 2024

(51) Int. Cl.
| | |
|---|---|
| *G06V 20/50* | (2022.01) |
| *G06K 7/14* | (2006.01) |
| *G06Q 10/0836* | (2023.01) |
| *G06T 7/70* | (2017.01) |
| *G06V 10/74* | (2022.01) |
| *G06V 10/82* | (2022.01) |
| *G06V 20/62* | (2022.01) |
| *H04N 7/18* | (2006.01) |

(52) U.S. Cl.
CPC ........... *G06V 20/50* (2022.01); *G06K 7/1443* (2013.01); *G06Q 10/0836* (2013.01); *G06T 7/70* (2017.01); *G06V 10/74* (2022.01); *G06V 10/82* (2022.01); *H04N 7/183* (2013.01); *G06T 2207/20084* (2013.01); *G06T 2207/30204* (2013.01); *G06V 20/62* (2022.01)

(58) Field of Classification Search
CPC ........ G06V 20/50; G06V 20/62; G06V 10/74; G06V 10/82; G06T 7/70; G06T 2207/20084; G06T 2207/30204; G06K 7/1443; G06Q 10/0836; H04N 7/183
USPC .......................................................... 348/375
See application file for complete search history.

(56) References Cited

U.S. PATENT DOCUMENTS

| | | | |
|---|---|---|---|
| 10,262,290 B1* | 4/2019 | Mossoba | G06V 20/20 |
| 10,367,915 B2* | 7/2019 | Levanon | G06F 3/14 |
| 10,627,244 B1* | 4/2020 | Lauka | G01C 21/3623 |
| 11,416,958 B1* | 8/2022 | Reichert | H04W 4/029 |
| 11,468,393 B1* | 10/2022 | Kalathil | G07C 9/21 |

(Continued)

*Primary Examiner* — Pritham D Prabhakher
(74) *Attorney, Agent, or Firm* — Shook, Hardy & Bacon L.L.P.

(57) ABSTRACT

Computer program products, methods, systems, apparatus, and computing entities are provided for optimizing package delivery and confirmation are disclosed. In one embodiment, the system's processors accesses a first image of an assigned delivery location captured by a first computing device. The first image comprises an annotation indicating a specific location at the assigned delivery location for delivery of a parcel. At a display device of a second computing device, a real-time image stream comprising the annotation is captured by a camera of the second computing device is displayed. The annotation is overlaid within the real-time image stream based on comparing the first image received from the first computing device to the real-time image stream. The system further captures, from the real-time image stream, a second image when the parcel is positioned at the specific location based on the annotation overlaid within the real-time image stream.

20 Claims, 13 Drawing Sheets

(56) References Cited

U.S. PATENT DOCUMENTS

| | | | |
|---|---|---|---|
| 11,499,835 B1* | 11/2022 | Lauka | G01C 21/34 |
| 11,861,546 B1* | 1/2024 | Wang | G06Q 10/0833 |
| 2018/0084083 A1* | 3/2018 | Levanon | G06F 3/1454 |
| 2021/0406825 A1* | 12/2021 | Lee | G06Q 30/0282 |
| 2022/0027845 A1* | 1/2022 | Silverstein | G06Q 10/0838 |
| 2022/0083964 A1* | 3/2022 | Silverstein | G06Q 30/0282 |
| 2022/0129841 A1* | 4/2022 | Gutke | G08B 13/19602 |

* cited by examiner

PHOTO INSTRUCTIONS AND CONFIRMATION

BACKGROUND

Historically, common carriers delivered a parcel to the requested location and simply left the box at the location (e.g. front porch) or hand delivered the parcel if the item required recipient signature. For some time, common carriers have sent a message, via email or text message, to a recipient indicating when a package has been delivered. Other delivery confirmation methods include capturing images of the item delivered at the requested location and providing such image to the recipient.

BRIEF SUMMARY

In general, embodiments of the present invention provide methods, apparatus, systems, computing devices, computing entities, and/or the like suitable for image processing.

At a high level, aspects described herein relate to providing photo instructions for a requested delivery that include an annotated image which includes both text and drawn boundaries indicating the exact desired location for delivery. Based on receiving the annotated image, a second computing device will utilize the annotated image to locate the exact delivery location requested, confirm the location, and deliver a parcel within the defined area for delivery. The annotated image is overlaid on the image from the second device. Upon delivery of the parcel, a real-time image will be captured of the delivery of the parcel within the annotated area and in compliance with the textual directions. The real-time image is then transmitted to a user device via email notifications, SMS, MMS, push notifications, and any other suitable means for confirmation of delivery.

This summary is intended to introduce a concept in a simplified form that is further described in the detailed description section of this disclosure. This summary is not intended to identify key or essential features of the claimed subject matter, nor is it intended to be an aid in determining the scope of the claimed subject matter. Additional objects, advantages, and novel features of the technology will be set forth in part in the description that follows, and in part, will become apparent to those skilled in the art upon examination of the following or learned by practice of the technology.

BRIEF DESCRIPTION OF THE SEVERAL VIEWS OF THE DRAWINGS

Figure 1:
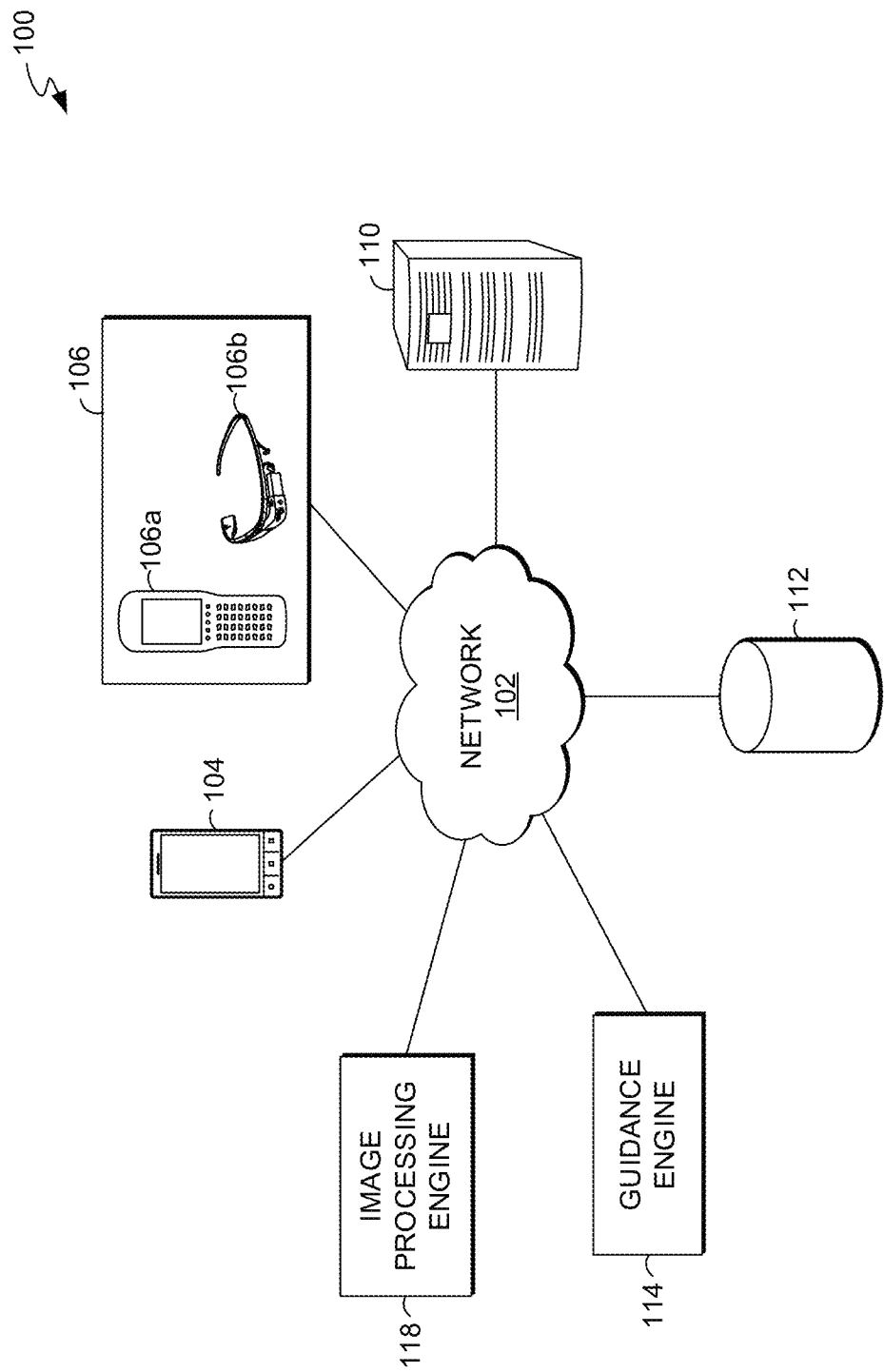

Having thus described the invention in general terms, reference will now be made to the accompanying drawings, which are not necessarily drawn to scale, and wherein:

FIG. 1 is a schematic diagram of an example operating environment in which the aspects of the present disclosure are employed in, in accordance with some embodiments.

Figure 2:
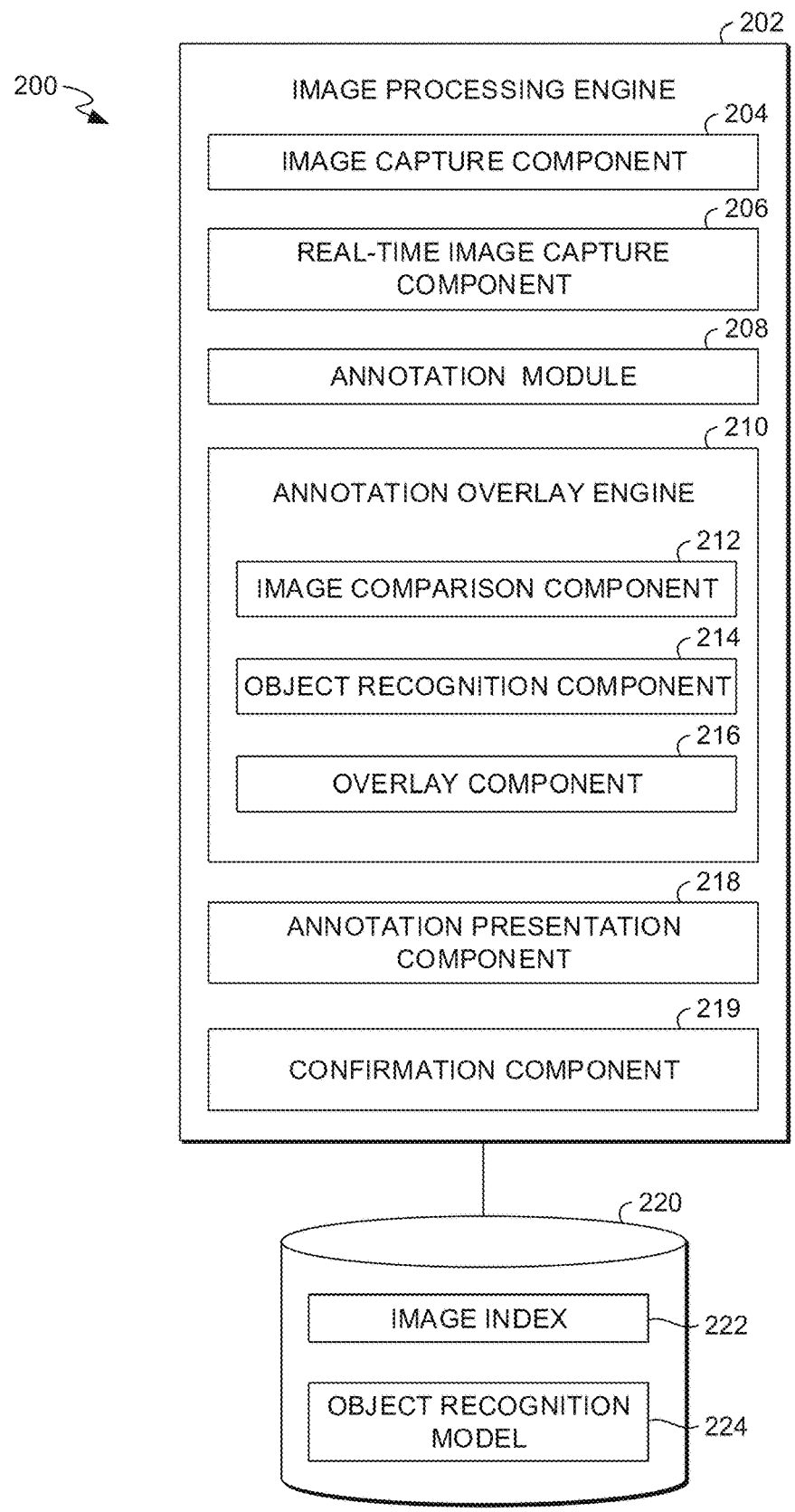

FIG. 2 is a block diagram of an example image processing system suitable for implementing some embodiments.

Figure 3:
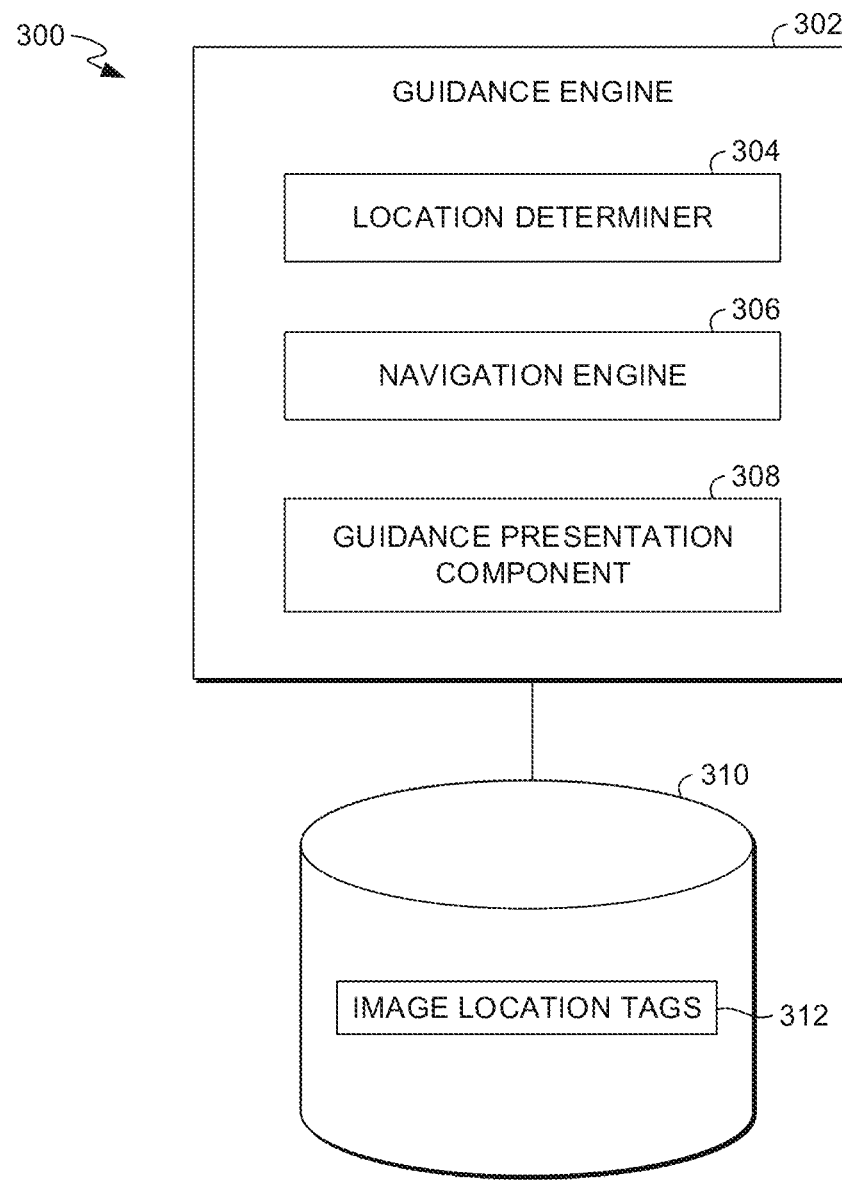

FIG. 3 is another block diagram of an example guidance system suitable for implementing some embodiments.

Figure 4C:
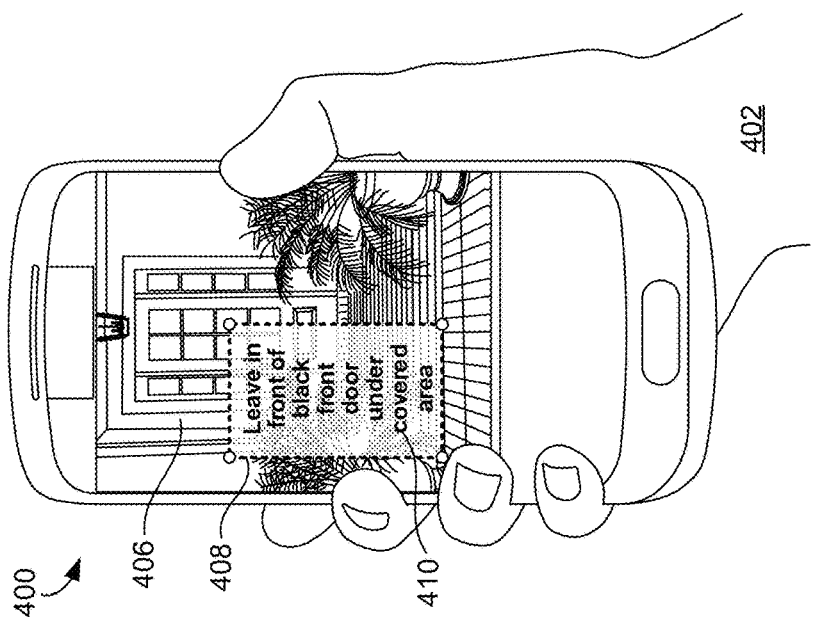
Figure 4B:
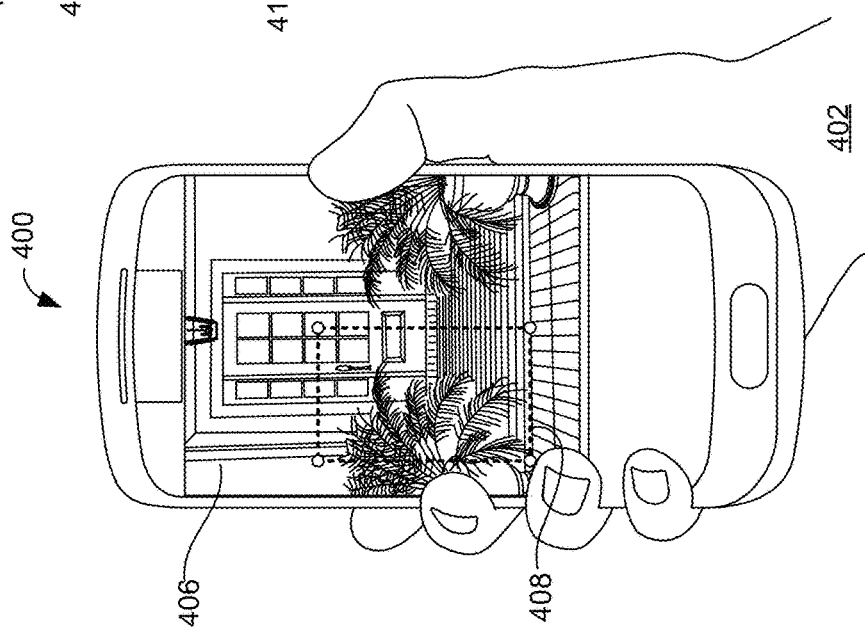
Figure 4A:
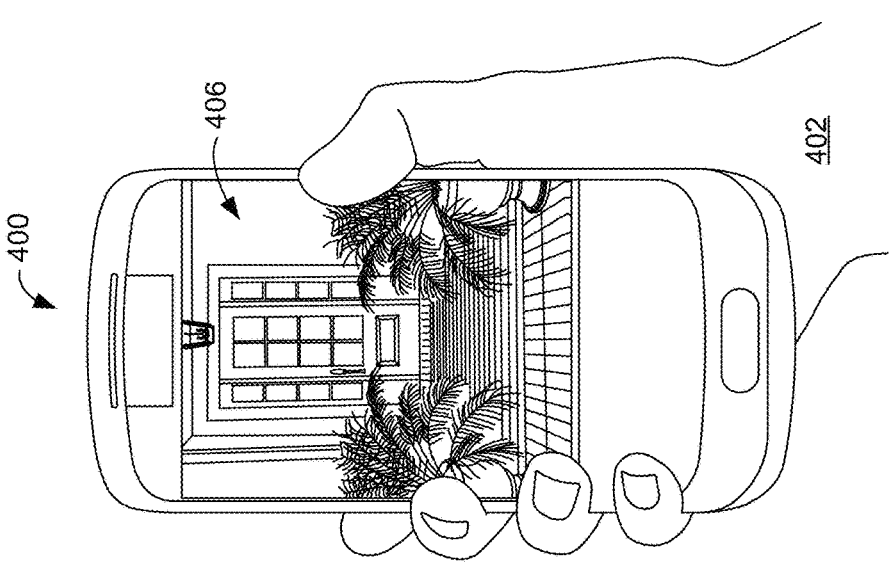

FIG. 4A illustrates an example first computing device capturing an image at an assigned delivery location.

FIG. 4B illustrates the example first computing device of FIG. 4A capturing an image at an assigned delivery location and a boundary marked annotation.

FIG. 4C illustrates FIG. 4B with additional text annotation within the boundary marked annotation.

Figure 5A:
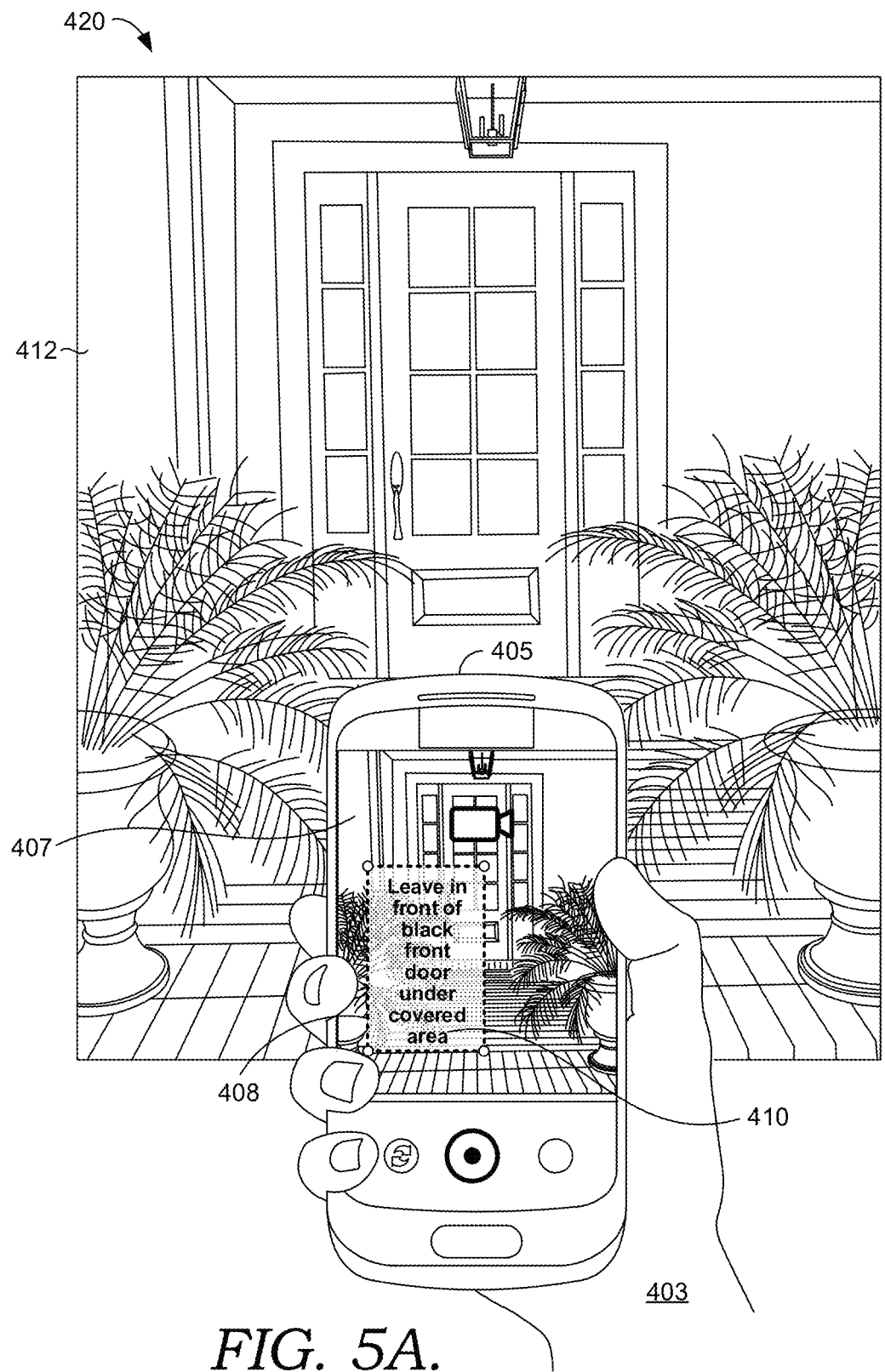

FIG. 5A illustrates an example second computing device capturing a real-time image of the delivery location with the annotation of FIG. 4C overlaid into the real-time image.

Figure 5B:
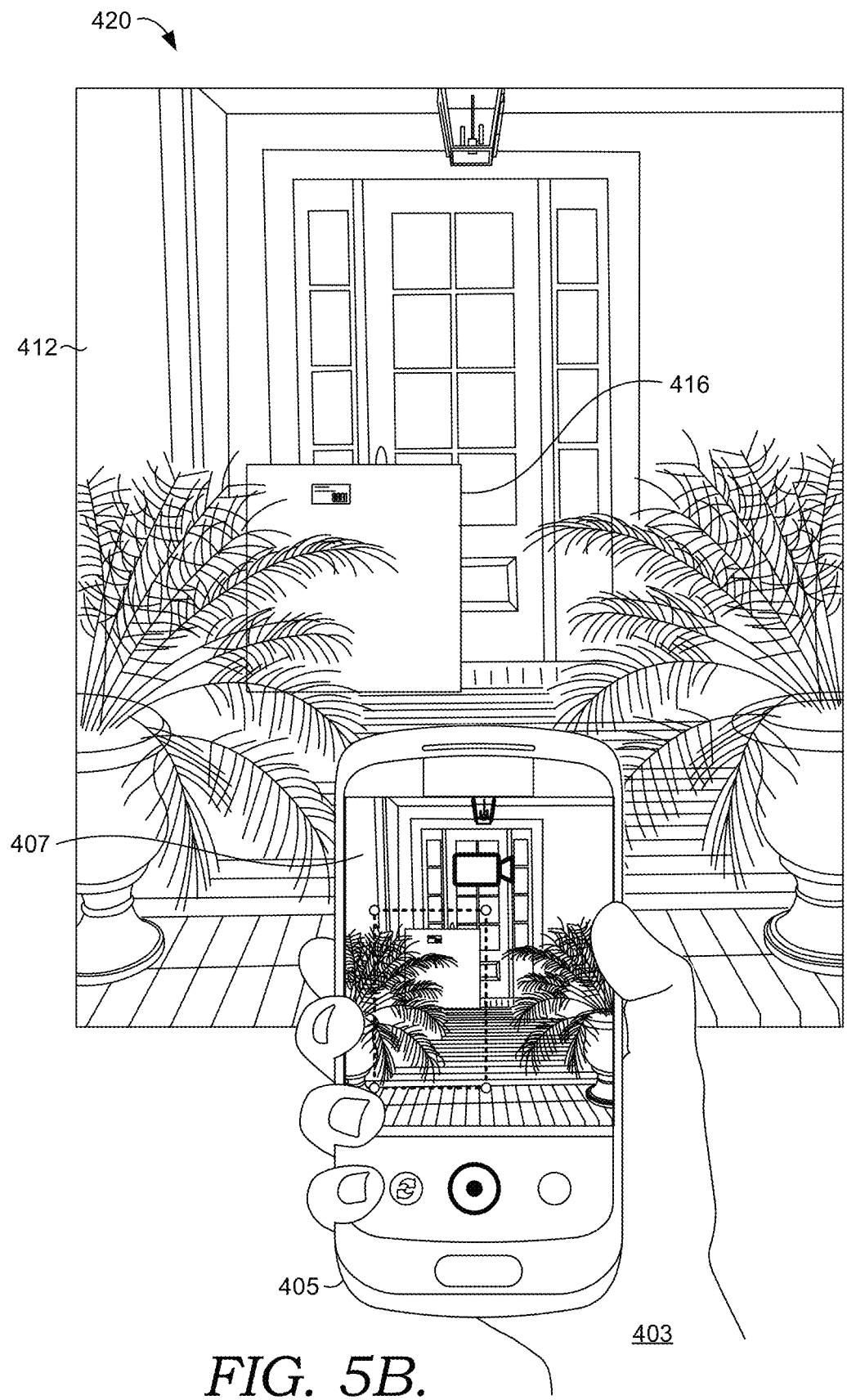

FIG. 5B illustrates FIG. 5A with a real-time image of a parcel to be delivered within the boundary marked annotation.

Figure 5C:
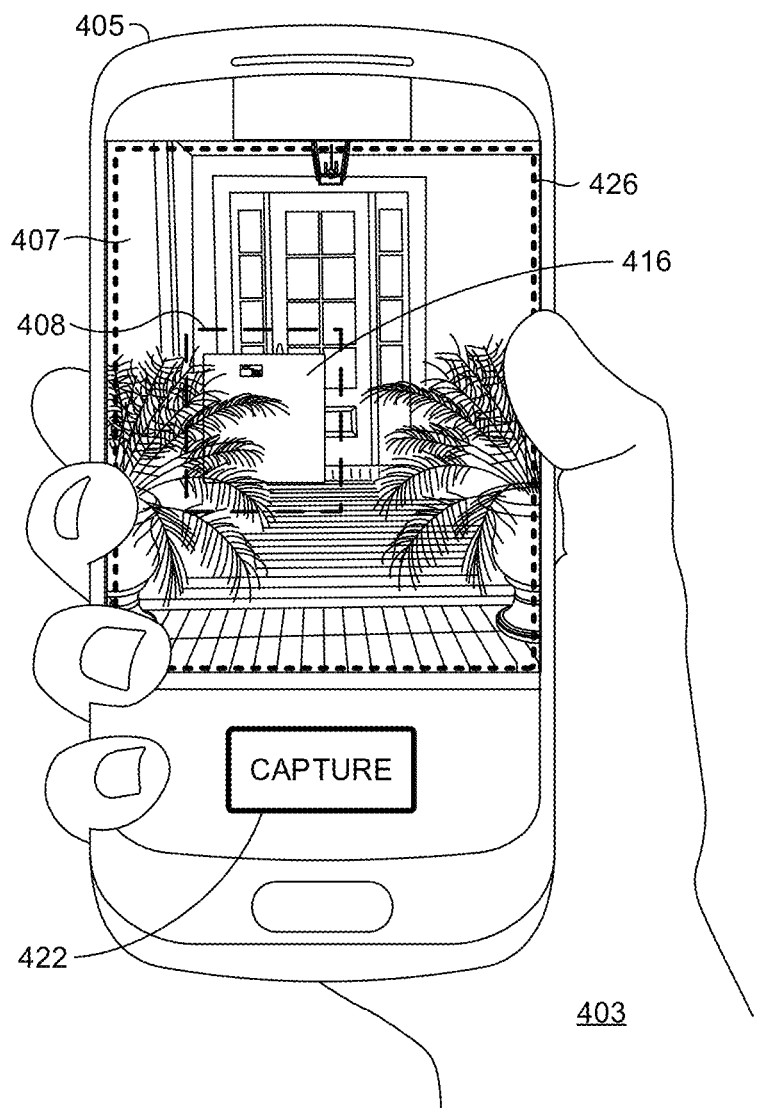

FIG. 5C illustrates the second computing device capturing the real-time image of FIG. 5B.

Figure 6B:
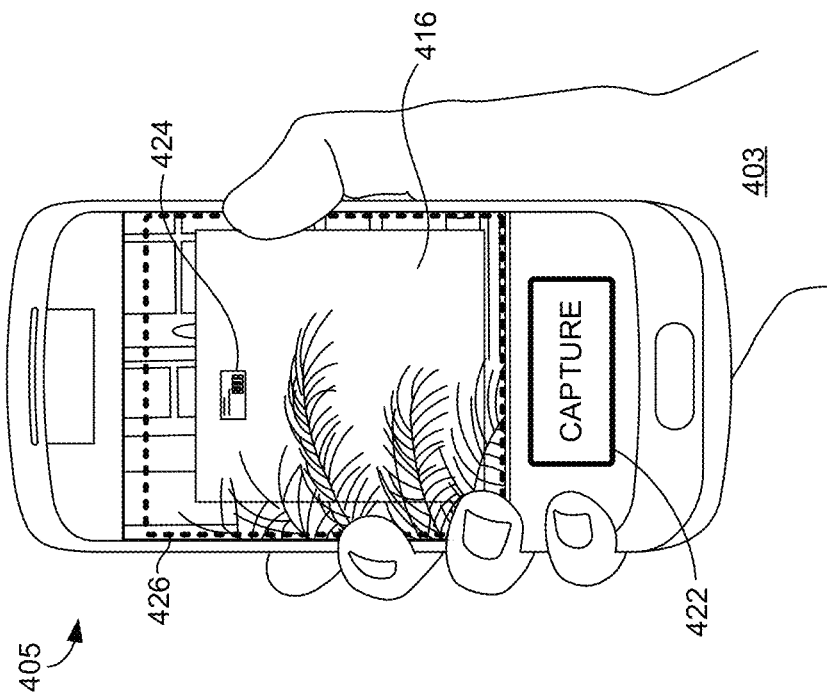
Figure 6A:
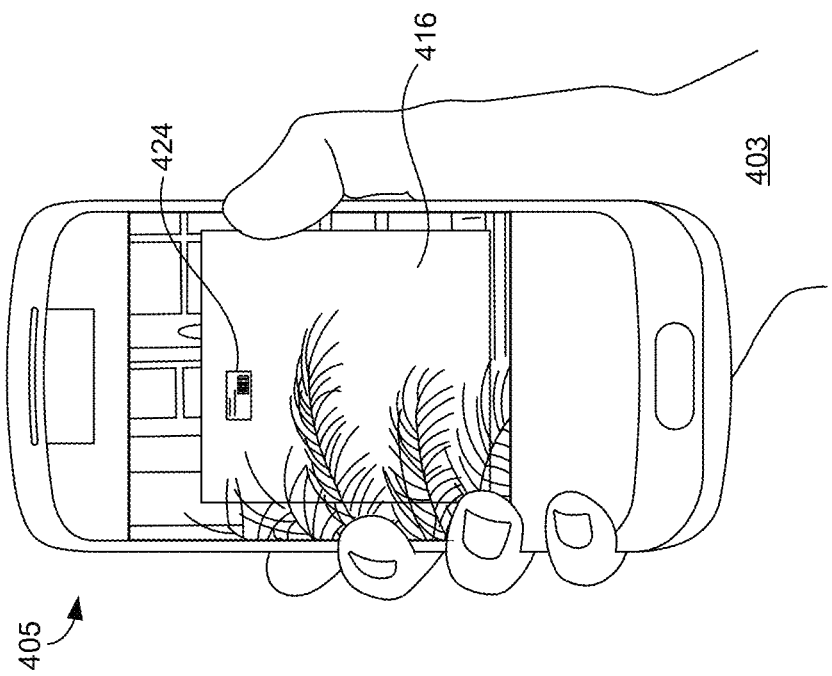

FIG. 6A illustrates an example second computing device capturing a real-time image of the parcel delivered at the assigned location.

FIG. 6B illustrates the capture of a real-time image of FIG. 6A showing the parcel delivered zoomed in on the machine readable indicia on the parcel.

Figure 7:
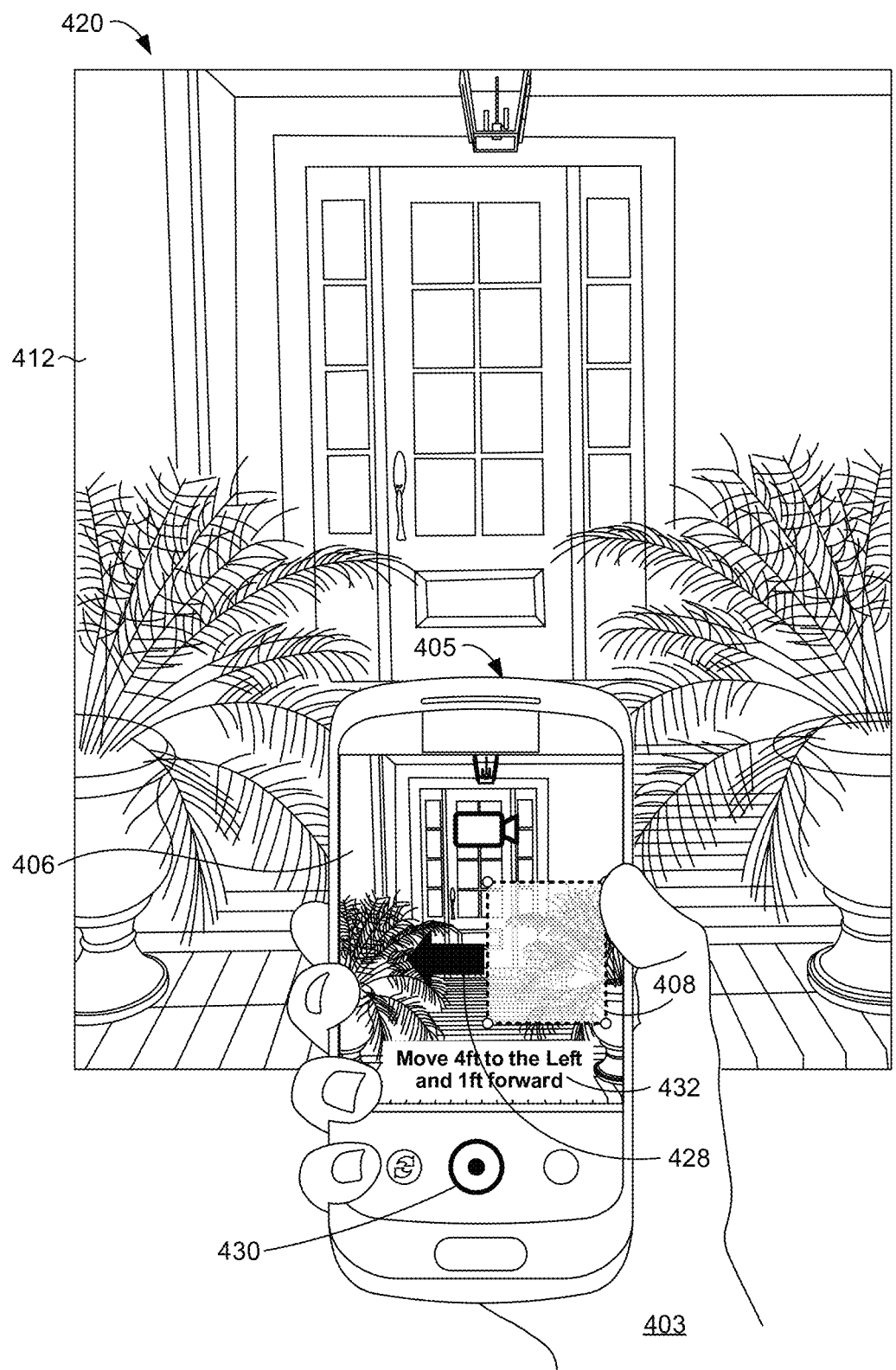

FIG. 7 illustrates an example second computing device displaying a live video stream with guidance instructions for delivery of the parcel at the assigned location.

Figure 8:
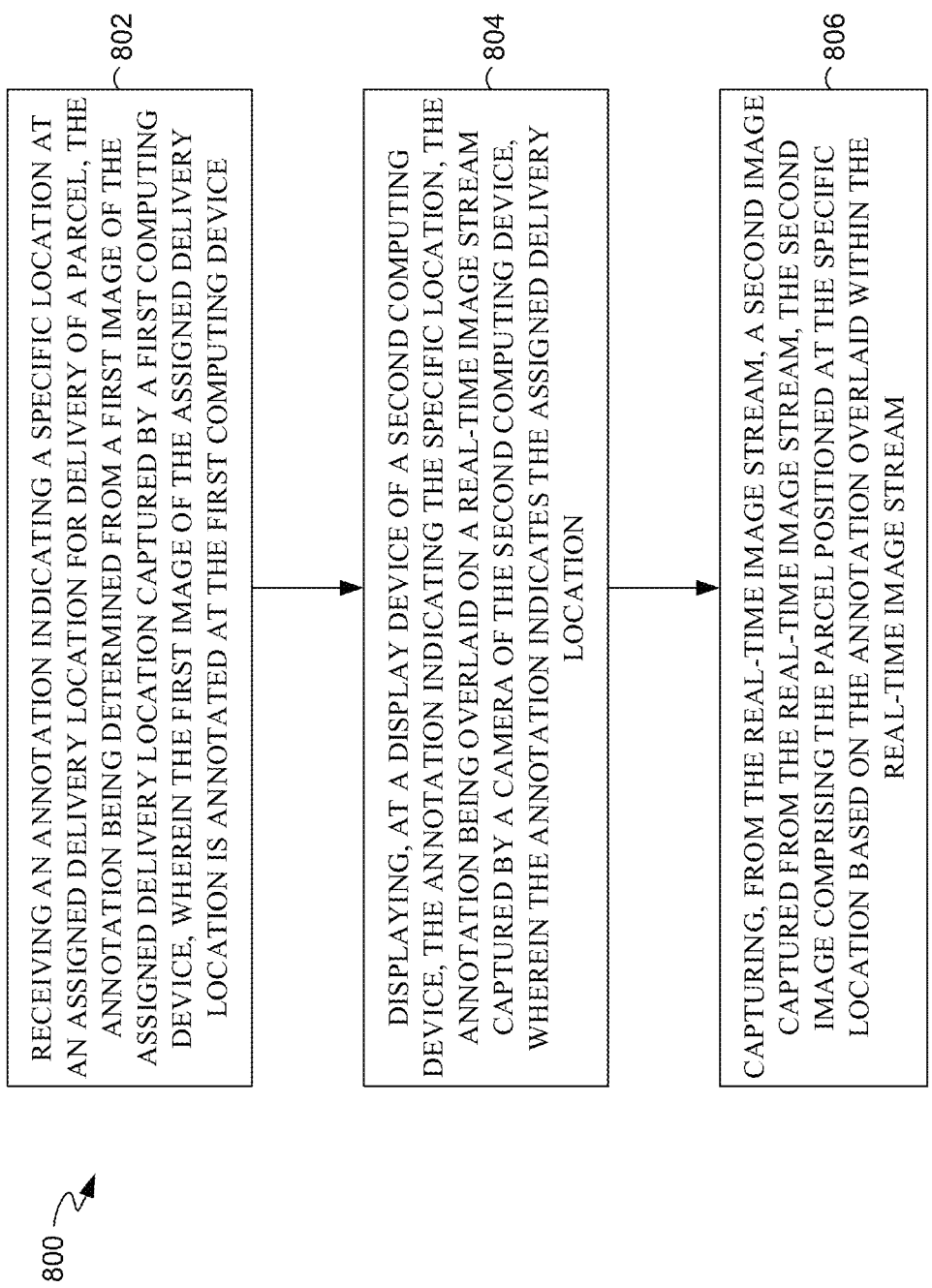
Figure 9:
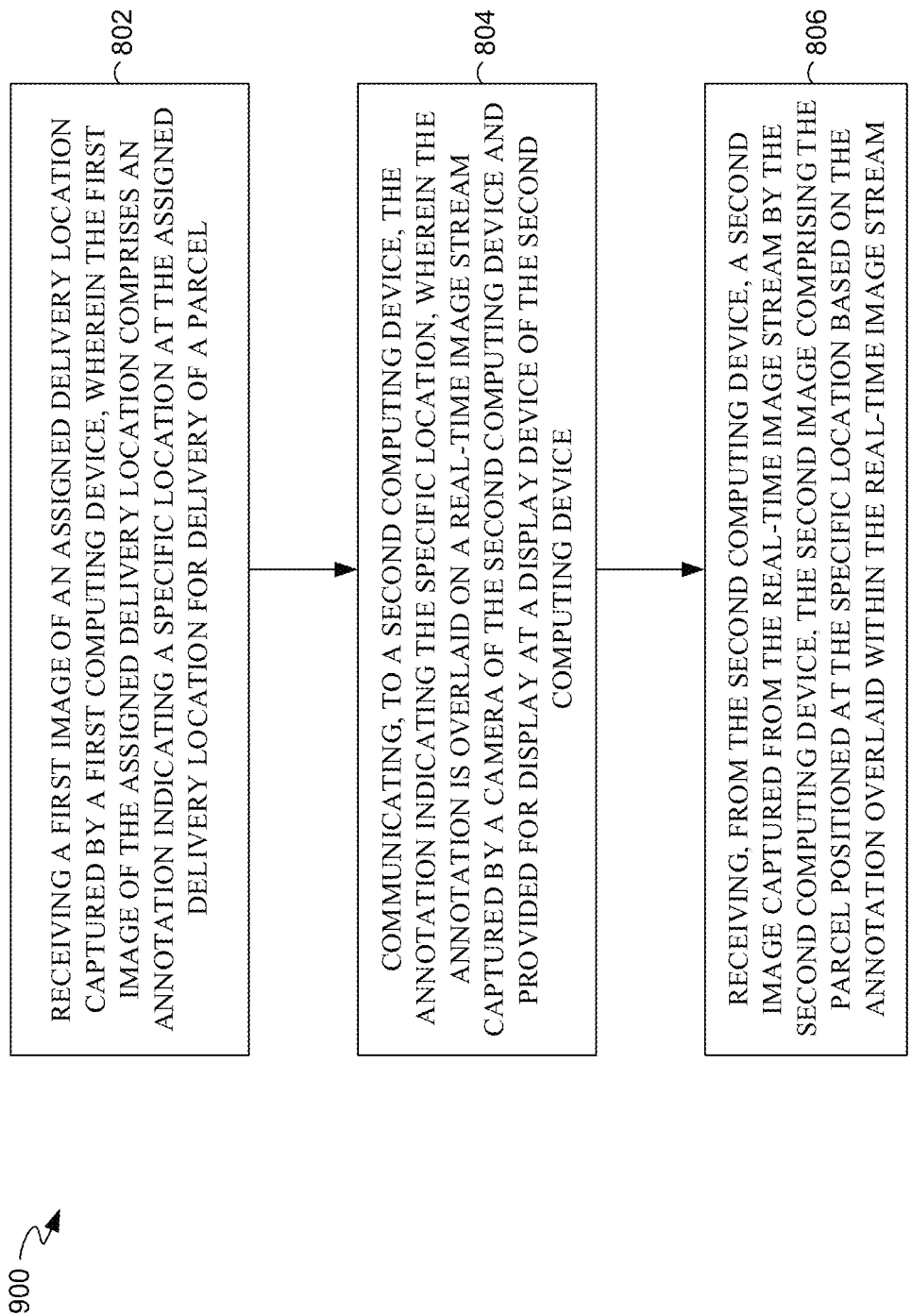

FIGS. 8-9 are flowcharts illustrating operations and processes that can be used in accordance with various embodiments of the present invention.

Figure 10:
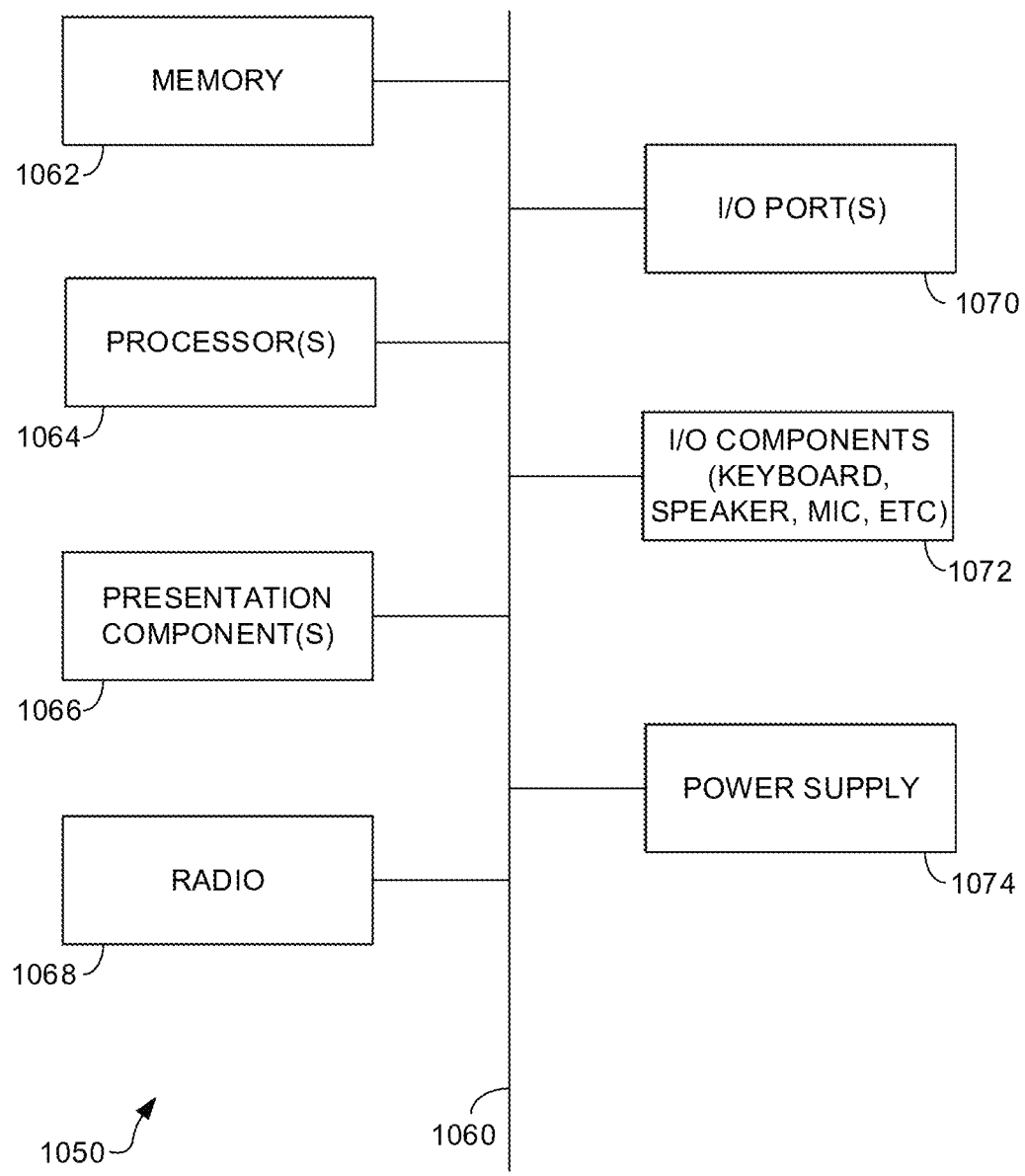

FIG. 10 is a block diagram of an example operating environment in which embodiments of the present technology may be employed.

Figure 11:
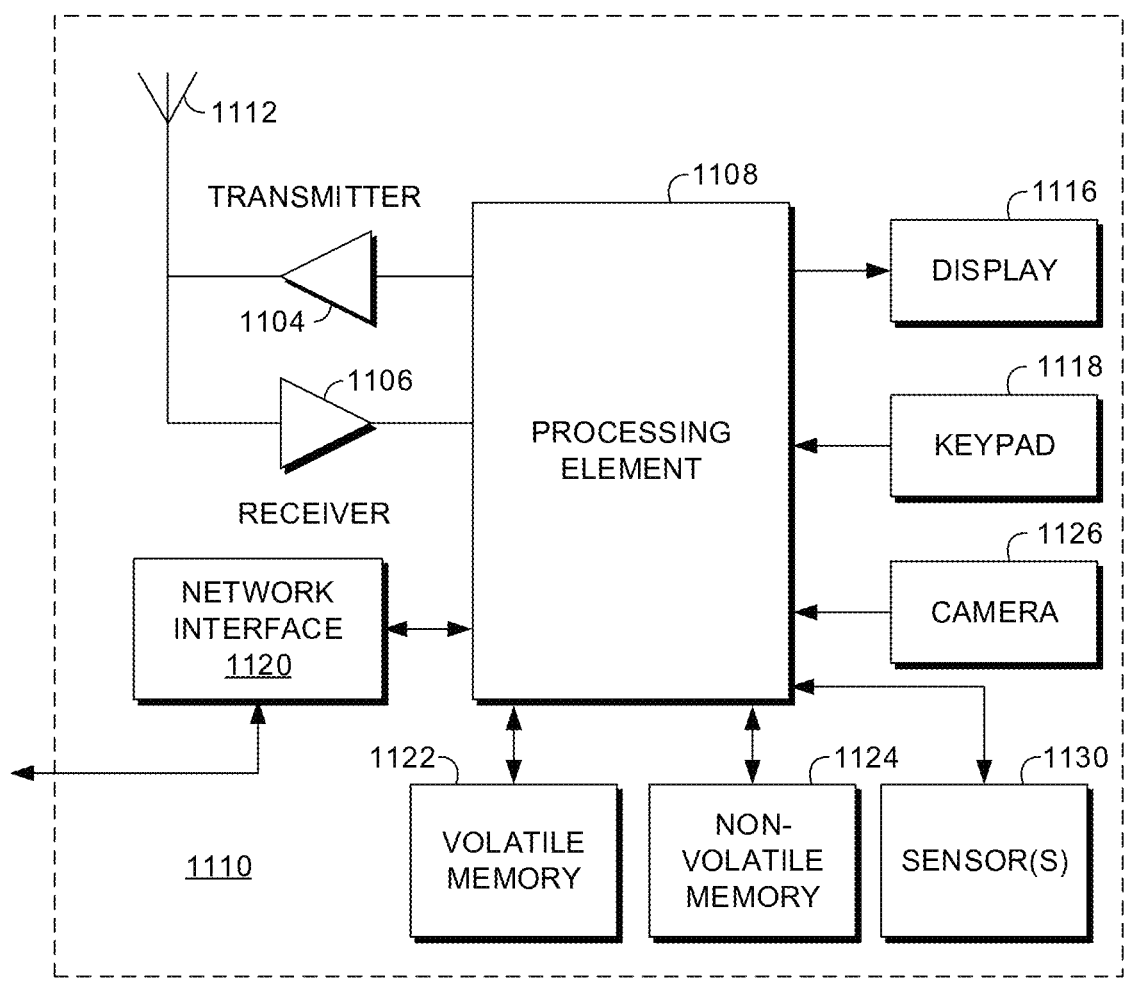

FIG. 11 is a schematic of a mobile computing entity in accordance with certain embodiments of the present invention.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

For years, common carriers would simply deliver a parcel to the requested location and deliver the parcel to the location, which may have been a business or residential location. There was no delivery confirmation process in place. As technology has evolved, common carriers began providing various types of delivery confirmation. Initially, certain packages that were of high importance or high value may have required an in-person signature at delivery. For some time, common carriers have provided electronic delivery confirmation in the form of emails, text messages, and push notifications to confirm delivery of the parcel. More recently, common carriers have begun to utilize capturing images of the item delivered at the requested location and providing such image to the recipient.

Currently, an image of an item delivered generally includes an image taken of the item delivered at the location. For example, a delivery person could deliver a parcel on the end of a walkway in front of a home, take a picture, and send such confirmation to the common carrier and to the customer. The delivery personnel's delivery requirement have included delivering the package to the location and providing an image of delivery, including, at times, instructions to deliver the parcel to a specific location within the destination. While providing the image of the photo delivery has been an improvement for both common carriers and consumers, this does not help prevent delivery to an incorrect destination. Prior methods left the possibility of delivery outside of the recipients preferred location, as a delivery person may be in a rush to make deliveries, thereby leading to inaccurate deliveries.

While customers have been able to provide some instructions for delivery, the instructional options have been limited. Current technology allows customers to provide instructions via a drop down menu or providing a note with the delivery request. These instruction options are helpful, but do not guarantee that the parcel will be delivered in accordance with the instructions and there is no procedure in place to confirm that the personnel has in-fact delivered the parcel as instructed. As such, there is room for improvement in current delivery technology that provides greater accuracy regarding delivery of parcels.

As discussed herein, the current disclosure discloses technology that closes the existing gap in the accuracy of parcel delivery location. At a high level, the technology discussed herein provides a recipient with the chance to provide photo instructions to the common carrier that specifically indicate the exact location for delivery at the destination. In embodiments, an individual can take a picture of the location for delivery at the delivery destination. After taking the picture, the individual is provided with the opportunity to add annotation to the photo to provide more specific directions on the location of delivery. The individual can utilize tools on the screen, such as shapes or a drawing tool, to create a boundary marker annotation on the photo taken to indicate the specific location that the individual would like the parcel delivered. For example, the individual may draw a dashed box on a corner of a porch, indicating that area is the specific place that the parcel should be delivered. Additionally, the individual can also include written instructions to provide further specificity regarding the delivery. Once the image is annotated, the annotated image is saved and stored for future use.

When the delivery personnel reaches the delivery destination, the delivery personnel will access the first image that includes the assigned delivery location comprising the annotation that indicates the specific location assigned for delivery of a parcel. The first image with the annotation is displayed on a second computing device. Additionally, a real-time image stream captured by the camera of the second device is displayed. The real-time image includes the annotation from the first image, which is overlaid with the real-time image stream based on comparison of the first image from the first computing device to the real-time image stream. In some embodiments, it is contemplated that the annotated photo may be stored, for example, at a database or on the DIAD itself. Once the parcel has been placed in the specific location requested, a second picture is taken with the parcel positioned at the specific location.

Further, by determining the location of first computing device and second computing devices when images are taken, it improves the accuracy for delivery of a parcel at the correct location. A real-time image is captured from a real-time data stream that is based on the location of the second computing device. The location of the second computing device is compared to the location of the assigned delivery location utilizing the real-time data, which allows the system to determine whether the delivery personnel is in the exact location where the first annotated image was taken. Utilizing an object recognition model, such as a convolutional neural network, the system is able to identify that the parcel is positioned at a specific locations that matches the location on the annotated image. When a parcel is positioned within a boundary marker that was previously inserted onto the first image as part of the annotation, the second image can be automatically captured in response to detecting the parcel is positioned within the boundary marker via the object recognition model. The second image automatically captured can be automatically transmitted to the first computing device so that the individual requesting delivery can receive an automatic photographic confirmation that the parcel was delivered according to the specific delivery instructions inserted in the annotated first image. This automatic capture and delivery of confirmation cuts down the delivery confirmation time and helps ensure a parcel has been delivered to the correct location.

The systems and methods described herein provide solutions for problems in image processing. As discussed, the technology allows for more accuracy in delivering parcels to consumers. With the delivery of a real-time image to the consumer that shows the parcel delivered with common carriers, increases the accountability of delivery personnel, and ensures delivery is performed at the correct location using image recognition techniques. Additionally, via the image analysis technology discussed herein, the systems and methods of this disclosure also assist the delivery personnel with increasing accuracy and providing the recipient greater security.

Having provided some example scenarios, a technology suitable for performing these examples is described in more detail with reference to the drawings. It will be understood that additional systems and methods for photo instruction and confirmation can be derived from the flowing description of the technology. FIG. 1 shows a schematic diagram of an example computer environment 100 in which the aspects of the present disclosure are employed.

As shown in FIG. 1, this particular operating environment 100 includes server 110, one or more computing entities 104, 106 (e.g., a mobile devices), one or more networks 102, an image processing engine 118, and a guidance engine 114, and/or the like. Each of these components, entities, devices, systems, and similar words used herein interchangeably may be in direct or indirect communication with, for example, one another over the same or different wired and/or wireless networks, such as network 102. Additionally, while FIG. 1 illustrates the various system entities as separate, standalone entities, the various embodiments are not limited to this particular architecture.

In various embodiments, the network 102 represents or includes an IoT or IoE network, which is a network of interconnected items that are each provided with unique identifiers (e.g., UIDs) and computing logic so as to communicate or transfer data with each other or other components. Each of the components of the system may be in electronic communication with, for example, one another over the same or different wireless or wired networks. As another example, network 102 may comprise a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

FIG. 1 shows one or more computing entities 104, and 106. In general, the terms computing entity, entity, device, system, and/or similar words used herein interchangeably may refer to a computing device, an example of which is provided and discussed with reference to FIG. 11.

In an embodiment, first computing device 104 is a mobile computing device comprising a camera as an input component and a display device as an output component. First computing device 104 may capture images or video using the camera and providing such captured imagery at the display device. In some computing devices suitable for use as first computing device 104, the display device may further be used as an input component for generating annotations. First computing device 104 captures, processes, annotates, and communicate images to other components of operation environment 100 in manners that will be more fully described. As will also be more fully described, first computing device 104 may be used to capture an image of a delivery location, and annotate the image.

First computing device 104 may further tag images with metadata that comprises location data. As an example, first computing device 104 can determine a location at a time when an image is captured by the camera. For instance, first computing device 104 may utilize cellular networks, satellite networks, or other like methods to determine the location, and tag an image with the determined location when the image is captured. Tagged images can be stored locally or communicated to other components of FIG. 1, such as datastore 112. Moreover, as noted, first computing device 104 annotates images. The location of annotations generated by first computing device 104 may be tagged with location metadata and communicated to other components of FIG. 1, such as datastore 112. Additionally, first computing device 104 may recall data stored in datastore 112, such as computer-readable instructions, which may be executed by a processor of first computing device 104.

In an embodiment, second computing device 106 is a mobile computing device comprising a camera as an input component and a display device as an output component. Second computing device 106 may capture images or video using the camera and providing such captured imagery at the display device. In a particular implementation of the technology, second computing device 106 facilitates delivery confirmation using image processing techniques that provide for identifying a parcel in a location of an annotation provided by first computing device 104. The display device may further be used for providing guidance instructions for navigating second computing device 106 to the location of an annotation, and determine and display the annotation by overlaying it on a live-image feed captured by the camera. Second computing device 106 may recall data stored in datastore 112, such as computer-readable instructions, which may be executed by a processor of second computing device 106.

While second computing device 106 may take on various embodiments of mobile devices, two examples that are suitable for use with the technology are illustrated. Device 106*a* is illustrated as a handheld mobile computing device having a display device and camera, whereby the camera captures imagery and displays it at the display device. The display device may also serve as an input component, among various other input components that may be found on device 106*a*. Device 106*b* may capture the imagery, overlay an annotation generated by the first computing device, and display at the display device the imagery having the annotation overlaid thereon at a location within the captured imagery.

Device 106*b* is an example of a wearable headset. Here, the headset may have a forward looking camera that captures imagery and to aid in determining location and position information of the headset. The headset may further comprise a transparent optic that is configured to be positioned within a line of sight when the headset is worn. The optic may display objects, such as annotation, by acting as a display device for generating an image of the object by the optic or by serving as a projection surface, where images are projected onto the optic and reflected through the line of sight such that they are visible by the wearer. In an implementation, the background area is visible through the optic, and an annotation is displayed at the optic such that the annotation is overlaid at a particular location on the visible background.

Server 110 is generally a computing device. The example computing device illustrated and described with respect to FIG. 10 is one example that is suitable for use. Server 110 communicates with other components of FIG. 1 via network 102. Server 110 may also retrieve information stored in datastore 112 and process such information in accordance with computer-readable instructions.

As will be further discussed, aspects of guidance engine 114 and image processing engine 118 can be employed by other components of FIG. 1, such as first computing device 104, second computing device 106, and server 110. Functional aspects of guidance engine 114 and image processing engine 118 may be in the form of computer-readable instructions and stored in datastore 112 for execution by other components of FIG. 1.

Datastore 112 generally stores information including data, computer instructions (e.g., software program instructions, routines, or services), or models used in embodiments of the described technologies. Although depicted as a single database component, datastore 108 may be embodied as one or more datastores or may be in the cloud. Datastore 112 may illustrate a distributed datastore, where datastores may be accessible locally or remotely by any of the components of FIG. 1. Datastore 108 can comprise machine-readable instructions corresponding to guidance engine 114 and image processing engine 118.

Having identified various components of operating environment 100, it is noted that any additional or fewer components, in any arrangement, may be employed to achieve the desired functionality within the scope of the present disclosure. Although components of FIG. 1 are depicted as single components, the depictions are intended as examples in nature and in number and are not to be construed as limiting for all implementations of the present disclosure. The functionality of operating environment 100 can be further described based on the functionality and features of its components. Other arrangements and elements (e.g., machines, interfaces, functions, orders, and groupings of functions, etc.) can be used in addition to or instead of those shown, and some elements may be omitted altogether.

Further, many of the elements described in relation to FIG. 1, such as aspects of guidance engine 114 and image processing engine 118, which will be more fully discussed with reference to FIG. 2 and FIG. 3, are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-readable instructions stored in memory. Moreover, the functions described in relation to guidance engine 114 and image processing engine 118, including those that are further discussed with reference to FIG. 2 and FIG. 3, may be performed a front-end (client-side), back-end (server-side), or both, and in any combination. That is, aspects of guidance engine 114 and image processing engine 118 that will be further detailed may be performed, entirely or in part, by first computing device 104, second computing device 106, server 110, or any other component, in any order or combination.

Having this in mind, reference is now made to FIG. 2. FIG. 2 illustrates a block diagram of an example image processing system 200 suitable for implementing some embodiments. Image processing system 200 is but one example and is not intended to suggest any limitation as to the scope of use or functionality of the invention. Neither should the image processing system 200 be interpreted as having any dependency or requirement relating to any one or combination of components illustrated.

Image processing system 200 includes an image processing engine 202. Image processing engine 202 is an example that is suitable for use as image processing engine 118 of FIG. 1. As shown in FIG. 2, the image processing engine 202 comprises several components including an image capture component 204, a real-time image capture component 206, an annotation module 208, an annotation overlay engine 210, and an annotation presentation component 218. The annotation overlay engine 210 further comprises sub-components including an image comparison component 212, an object location component 214, and an overlay component 216. The components illustrated within the image processing engine 202 are illustrated as an example. More or less components may be used by the system may be provided.

The image capture component 204 is generally configured to facilitate capturing various types of data related to images. The data collected regarding images from the image capture component may be indexed as structured data and unstructured data. Structured data includes data that is organized in some scheme that allows the data to be easily exported and indexed with minimal processing. Structured data can generally be collected and rearranged to comport to the index. Unstructured data is anything other than structured data. It relates to an item and generally discusses the item within context. However, unstructured data generally requires additional processing in order to store it in a computer-useable format.

In general, the image capture component 204 can be used by a device, such as first computing device 104 or second computing device 106 of FIG. 1, to capture an image. In an embodiment, image capture component 204 is employed by a device in response to an input received at the device. Image capture component 204 causes the device to initiate a camera. As an example, this can be performed at an assigned delivery location to capture an image of the assigned delivery location for an item. When initiated, the camera captures light (visible, infrared, UV, or the like) at a lens. In some device types, the lens focuses the light onto a digital sensor that constructs image data from the received light. The image data is stored, and from which a digital image can be reproduced for display.

In one example method, a computing device may use a camera to capture an image and generate image data. As an example, a user device having a display and a camera may be used. The camera captures image data that represents the visual images of the background area in the field of view (FOV) of the camera. The background area is all of or a portion of the real-world environment around the camera.

As noted, when storing the image data, a location tag can be associated with the image. The device capturing the image using image capture component 204 may determine a location at a time the image is captured. The location data is stored in association with the image, thereby tagging the image with location metadata.

In an embodiment, using the image capture component 204, a first computing device captures a first image of an assigned delivery location. The first computing device may be any device capable of capturing the first image of an assigned delivery location, and for example, may correspond to first computing device 104 of FIG. 1. For example, the first computing device may be mobile device or tablet. When the first computing device captures the first image of the assigned delivery location, the first image may be tagged by the first computing device with a specific location at the assigned delivery location for delivery of a parcel. For example, a first user, utilizing the first computing device, captures a first image via the image capture component 204, and will annotate, via the annotation module 208, the first image with specific details regarding the delivery instructions. Additionally, once the image capture component 204 captures the first image, the first image may be stored in the data store 220. As will be further described, the second computing device may also initiate image capture component 204 to capture and image.

The real-time image capture component 206 generally facilitates capturing a real-time image stream. Real-time image capture component 206 may be employed by a computing device, such as first computing device 104 or second computing device 106 of FIG. 1. When employed by a computing device, real-time image capture component 206 may cause the computing device to initiate a camera. In a manner similar to image capture component 204, real-time image capture component 106 uses the camera to capture image data. The image data may be continuously captured as a real-time data stream by the camera and reconstructed as a real-time continuous image. In some cases, the real-time time image stream is provided at a display device of the computing device as the real-time continuous image of the line of sight of the camera. In an embodiment, image capture component 204 may be employed to capture an image from the real-time image stream by identifying and saving a portion of the image data of the real-time image stream.

The annotation module 208 is utilized by a computing device, such as the first computing device 104 or the second computing device 106 of FIG. 1, to generate an annotation. As noted, annotations may comprise any object, including text. Annotations can be generated using image capture component 204 or within the real-time image stream generated using real-time image capture component 106.

When employed by a computing device, the annotation model 208 identifies inputs provided at the computing device, and from the input, generates an annotation. For example, the annotation module 208 can be used to draw a boundary marker that indicates a specific location for delivery of a parcel. That is, an input can be identified indicating boundaries of a specific location or area within the image data. The boundaries are saved as the boundary marker. The boundary marker can be associated with location data determined from the computing device and stored in a datastore, such as datastore 220 within image index 222 of FIG. 1.

The boundary marker can further be associated with the specific location based on the orientation of the computing device, and the position at which the boundary marker is placed relative to the image data. For instance, when the input is received for generating the boundary marker, the location data of the device, the orientation of the device at the location of the device, and the position at which the boundary marker is placed in the image data captured by the device is determined. Such information can be stored within image index 222. Examples such as these provide a way to populate image index 222 with images comprising annotations, such as boundary markers. Moreover, examples such as these provide a way to populate image index with annotations, generated by the computing device, that are associated with location data, and may be further associated with device orientation and a relative position of the annotation within image data captured by the device. Such data can be used to determine the specific area at which the annotation is placed and, when boundary markers are used as annotations, the specific location as delineated by the boundary marker. In an implementation, the annotation comprises human readable text. Likewise, the human readable text can be associated with location data, and other positional data, such as device orientation and a location at which the annotation was placed in the image data, and may be stored in datastore 220 as part of image index 222.

In an example implementation, the first user, utilizing a first computing device employing the annotation module 108, can create the annotation indicating the exact location the first user would like the parcel to be delivered. As shown in FIG. 4B, the annotation module 208 is used to annotate the first image to indicate that the delivery parcel should be delivered on the left bottom area of the porch.

In some cases, the annotation module 208 may define digital boundaries in space and identify areas relative to the boundaries as areas as the location for the parcel to be placed. The annotation comprises a boundary marker, the boundary marker delineating the specific location at the assigned delivery location. Various different types of boundaries may be used.

FIGS. 4A-4C illustrate a first computing device employing annotation module 208 to generate an annotation at an assigned delivery location for a parcel. The annotated boundary created is a rectangle comprising of dashed lines. The annotation module 208 may include instructions that define a boundary using distances from objects in the first image, such as the front door. Additionally, the annotation module 208 may provide machine-readable instructions that define the specific location for delivery within the annotated box. These instructions provide additional clarification as to the desired specific delivery location in order to reduce the chance of any errors in delivery. The second image is captured from the real-time image stream when the parcel is positioned within the boundary marker.

Referencing FIG. 4A, a first computing device 400 is shown being held by a first user 402. The display device of the first computing device 400 includes an image 406 captured by the first user of a location for delivery. Image 406 is representative of an image captured using image capture component image capture component 204 or is a real-time image being captured and provided by real-time image capture component 206. In this case, the example location is a front porch of a home. The first user 402, has utilized the first computing device (in this case, a mobile phone), to capture an image of the desired delivery location (the porch) at the delivery address.

As shown in FIG. 4B, once the first image is captured by the image capture component 204, the first user annotates the first image, via the annotation module 208. In this case, annotation module 208 is employed by computing device to generate a boundary marker (dashed rectangle) 408, which illustrates the exact area where the first user would like the parcel to be delivered within the porch. As noted previously, annotation module 208 may also be used to annotate a live image being provided by real-time image component 206. In this example, annotation module 208 is being used to further add human readable text 410, as illustrated in FIG. 4C, instructing the delivery person to leave the parcel in front of the black front door under covered areas as seen at 410. As mentioned, once the first image is annotated by the first user, the first image is stored in the data store 220 of FIG. 2 along with any associated data, as previously described. In one embodiment, the annotation is made on an image and the annotated image is stored with any associated data as previously discussed. In another example embodiment, the annotation is made on the live image generated from the real-time image data, and the annotation, or an annotated image captured from the real-time data stream, is stored with any of the associated data previously discussed.

Image processing engine 202 comprises the annotation overlay engine 210. The annotation overlay engine comprises an image comparison component 212, an object comparison component 214, and an overlay component 216. The annotation overlay engine 210 utilizing the image comparison component, 212, the object comparison component 214 and the overlay component 216 overlays the annotation indexed in image index 222 onto the real-time image stream of a computing device.

In one example implementation, the image comparison component 212 compares the first image captured by the image capture component 204, as annotated by annotation module 208, with the real-time image to determine whether the real-time image corresponds the annotated image. That is, the real-time image data captured by a computing device, such as the second computing device 106 of FIG. 1, is compared to the stored annotated image to determine whether the real-time image data matches or at least partially matches the stored image data.

In an implementation, the stored annotated image may be accessed by the computing device based on the location of the computing device. For instance, the location of the computing device is determined and the annotated image is accessed from image index 220 based on the computing device being within a threshold distance between the computing device location and the location metadata associated with the annotated image. In an aspect, the annotated image is compared to the real-time image data to determine whether a background of the annotated image matches or at least partially matches the real-time image data.

As an illustrative example, image comparison component may generate a vector representation of the real-time image data continuously or incrementally. This is compared to a vector representation of the image comprising the annotation. A cosine similarity metric may be used for the comparison. Where the vectors are within a threshold distance, the real-time image data is identified as matching or at least partially matching the image comprising the annotation. The forgoing provides one example by which image comparison component 212 may compare the real-time image data with images provided in image index 222.

The object recognition component 214 identifies objects, such as a parcel, within the real-time image data of the real-time image stream. In an implementation, object recognition component 214 identifies a parcel was placed within the specific area indicated by an annotation of the image data accessed from image index 222. To identify objects within image data, such as the real-time image data, object recognition component 214 may employ object recognition model 224.

One example of object recognition model 224 is a deep learning model trained to identify objects in image data. Object recognition model 224 may be a neural network. In a specific implementation, the object recognition model 224 is a convolutional neural network (CNN). The object recognition model may be trained to identify objects, such as parcels, using supervised learning techniques.

The overlay component 216 overlays the annotated first image with the real-time image streamed by the second computing device.

At a high level, the technology may utilize augmented reality method or techniques. Augmented reality is a process that typically involves superimposing data in the form of images onto a real-world background, as viewed at a display on a user device. In another implementation, data may be displayed at an optic to place an object with in the line of sight through the optic such that is appears projected at a particular location within the background. By using augmented reality, real-world background images of an area may be rendered and displayed at computing device, such as the first or second computing devices previously described.

The annotation presentation component 218 presents the annotated first image to the computing device. As noted, augmented reality techniques may be used to present the annotated image at a display device, at a transparent optic, or another like output component. For example, the annotation presentation component 218 will present the annotation at the output component of the computing device, such as the first or second computing device. Annotation presentation component 218 may present the annotation as overlaid on an image at the computing device, such as overlaid on a display device or projected at an optic at a location corresponding to a particular are within the background as viewed through the optic. In one particular example, the boundary marker is presented on the second computing device's screen overlaid over the live stream real-time image from real-time image capture component 206.

In an example embodiment, a real-time image stream is captured by a second computing device using real-time image capture component 206. The real-time image stream may be provided at a display device, which may include a transparent optic in some computing devices. The image comparison component 212 compares an image captured at a first computing device with the real-time image stream and determines whether the image captured by the first computing device matches or at least partially matches a portion of the real-time image stream. When the image at least partially matches the real-time image stream, the overlay component 216 overlays the annotation within the first image at a location within the real-time image stream that corresponds to the location of the annotation in the first image based on at least partially matching the first image with the real-time image stream.

In another example embodiment, the image overlay component 216 overlays the annotation within the real-time image stream of the computing device. The annotation indications a specific location within the real-time image stream. As noted, the annotation may be stored with metadata indicating the location of the computing device that generated the annotation, such as a first computing device. Based on the location associated with the annotation, the image overlay component determines the specific location indicated by the annotation using the location of the computing device providing the real-time image stream, such as a second computing device. The location of the computing device capturing the real-time image stream is compared to the associated specific location of the annotation, and the position of the computing device capturing the real-time image stream is determined relative to the specific location. Based on the relative position, the annotation is overlaid by the overlay component within the real-time image stream. This can be done when the real-time image stream comprises the specific location as determined from the position of the specific location relative to the computing device. The annotation can be overlaid to indicate the specific location within the real-time image stream.

In some implementations of the technology, the annotation may further be stored with other metadata, such as an orientation or position of a computing device when the annotation is generated, or the relative position of the generated annotation within the field of view of the computing device. Such data may provide a precise location of the annotation as generated by the computing device. The annotation overlay component 216 may further utilize such associated information to overlay the annotation within a real-time image stream of a computing device, such as second computing device. For instance, the position of a computing device capturing a real-time image stream is determined relative to a location of another computing device at an assigned delivery location that generated the annotation. The position of the annotation relative to the computing device that generated the annotation is determined from the orientation of the computing device and the location at which the annotation is generated within a field of view of a camera. Such location indicates the specific location and the location at which the annotation is to be overlaid by the second computing device capturing the real-time images stream. When the second computing device capturing the real-time images stream comprises the specific location within its field of view, as determined from the relative position of the second computing device to the first computing device and from the orientation and location at which the first computing device generates the annotation, the annotation overlay component 216 overlays the annotation at a location within the field of view of the second computing device, where the location at which the annotation is overlaid corresponds with the specific location at which the annotation is generated.

The annotation presentation component 218 generally presents the annotation as overlaid on the background using overlay component 216. That is, in some computing devices, presentation component 218 communicates for presentation, at a display device, the annotation, where the annotation is communicated for display at a position within a real-time images stream that corresponds to the specific location within the field of view the computing device capturing the real-time image stream, as determined by the overlay component 218 in some implementations. As noted, annotation may be presented for display at a display device of a computing device, projected onto an optic through which the background is visible, or presented using another like display device.

As previously noted, components of FIG. 2 may utilize object recognition model 224 to identify objects, such as parcels within an image or real-time image stream. For implementation with the technology, general image recognition models may be employed. Deep learning models, such as CNNs, are suitable for use in some aspects. Some implementations of the technology used an object recognition model that has been trained, fine-tuned, or the like to identify parcels within an image or real-time image stream.

As an example, supervised training methods can be used on a neural network, such as an CNN, to identify parcels. To do so, a training dataset comprising labeled training data may be used. The labeled training data can comprise images of known parcels that have been labeled with to indicate the parcel. In some cases, the boundaries of the parcel within the images can be identified and labeled as such. The neural network is trained using the training data, and as a result, the trained neural network is configured to receive an image, a still image or an image from a real-time image stream, as an input, and in response, identify whether there is a parcel in the image. Bounding boxes or other features indicating the location of the parcel within the image, as identified by the neural network, can be used to indicate the location of the parcel within the image.

In some implementations, a natural language processing model may further be employed by a computing device. The natural language processing model can be employed on the image data from the camera to identify textual data within the camera's field of view, such as textual data provided on a label of a parcel. Some suitable natural language algorithms are known in the art, and would be understood by those of ordinary skill in the art. In another implementation, an optical code model may be used to identify optic codes, such as bar codes, Aztec codes, Quick Response (QR) codes, and so forth. Such codes are machine readable using the optical code models, and embedding information within the codes are translated into machine usable information by the optical code model. As an example, and optical code model may be employed by a computing device to read an optical code, from which usable information is extracted, that is affixed to a parcel.

Confirmation component 219 may be used to confirm a delivery. That is, the delivery of a parcel to an assigned delivery location may be confirmed using the image capture and processing methods described herein.

In an example embodiment, a parcel is placed at a specific location at an assigned delivery location. A computing device, such as a second computing device associated with a carrier of the parcel, employs real-time image capture component 206 to capture a real-time image stream of an area within the field of view of a camera of the second computing device. When the specific location with within the field of view of the camera, overlay component 216 overlays the annotation such that the annotation is overlaid, when presented using annotation presentation component 218, at an area corresponding to the specific location within the real-time image stream.

In the example, the placed parcel is now also within the field of view of the camera as is present in the background. The parcel is identified using object recognition component 214 employing object recognition model 224. As noted, the boundary, the parcel edges, a bounding box, or the like is identified using the object recognition model 224. When the boundary of the parcel is within the specific location as indicated by the annotation, the second computing device may use image capture component 204 to capture an image of the field of view, and having the parcel in the specific location. Image capture component 204 may automatically capture an image comprising the parcel in the specific location in response to the second computing device detecting, using the overlay component 216 and the object recognition component, for instance, that the parcel is the specific location. As noted, the annotation may be in text form indicating the specific location, or may take on a graphic illustration, such as a boundary marker.

In an aspect, the annotation is a boundary marker, and the boundary marker is overlaid and displayed using overlay component 216 and annotation presentation component 218 when the specific location is within the field of view of the camera and is represented by the real-time image stream. Using the object recognition component 214, the second computing device detects the parcel. The object recognition component 214 may detect the edges or identify a bounding box for the parcel. When the edge of the parcel, the bounding box for the parcel, or other like object recognition feature, is determined to be within the overlaid annotation in the real-time image stream, the second computing device may capture an image of the parcel in the specific location, as indicated by the annotation. This can be done using image capture component 204, for instance. In an implementation, image capture component 204 automatically captures the image of the parcel at the specific location within the boundary marker in response to detecting that the object recognition feature (such as the parcel edges, the bounding box, etc.) are within the specific location (e.g., within the boundary marker indicating the specific location).

In an example embodiment, the image is captured by image capture component 204 based further on the location of the second computing device relative to the assigned delivery location of the parcel. That is, the location of the second computing device is compared to the assigned delivery location of the parcel. A predetermined threshold distance can be referenced when comparing the location of the second computing device and the assigned delivery location of the parcel. A non-limiting example for the predetermined threshold distance is 100 meters. Other threshold distances may be used. In urban areas, the predetermined threshold distance may be relatively lower than in rural arears, since delivery locations may be more dense in urban areas. As an example only, the threshold distance for an urban area may be 10 meters, although any predetermined number may be used and suffice for implementing the technology. Based on comparing the location of the second computing device with the location of the assigned delivery location, it is determined whether the location of the second computing device and the assigned delivery location is within the threshold distance. If so, confirmation component 219 can confirm that delivery of the parcel has been made. That is, confirmation component 219 may confirm the delivery when the parcel is within the specific location as indicated by the annotation and when the second computing device is within the threshold distance. In another example embodiment, image capture component 204 may capture an image in response to the parcel being at the specific location as indicated by the annotation and based further on information extracted from a label of the parcel, as further illustrated by FIG. 6A-6B.

That is, as noted, a computing device, such as the second computing device may identify human-readable text or a machine readable optical code on the label of the parcel, e.g., using the natural language processing model or the optical code model. Information extracted from the parcel label can be used to identify the assigned delivery location. For instance, the text may include the assigned delivery location, while the optical code may comprise an embedded representation of the assigned delivery location. In another case, the text or code may provide the second computing device with a parcel identifier that can be used to retrieve the assigned delivery location from the server.

In an example embodiment, the second computing device determines that the parcel is at the specific location of the assigned delivery location as indicated by the annotation. Moreover, the second computing device, using the label of the parcel, identifies the assigned delivery location and compares the assigned delivery location to the location of the second computing device. The second computing device, using image capture component 204, may capture an image of the parcel at the specific location based on the annotation and the location of the second computing device relative to the assigned delivery location, e.g., whether the second computing device is within the threshold distance relative to the assigned delivery location. In an embodiment, the image may be captured by the second computing device in response to an input. In another embodiment, the image may be automatically captured by the second computing device based on determining the parcel is at the specific location as indicated by the annotation, and the second computing device is within the threshold distance relative to the assigned delivery location, a determined from information extracted from the parcel label. In a specific embodiment, the information from the label is extracted with the parcel is within a boundary marker annotation. Confirmation component 219 may confirm the delivery based on or in response to the captured image.

As illustrated, FIG. 2 also includes datastore 220. Datastore 220 is the type of datastore described with respect to datastore 112 of FIG. 1. Datastore 220 is illustrated as including image 222 and object recognition model 224. The data illustrated within datastore 220 is illustrated as an example. More or less data elements, or combinations of data elements used by the system may be provided. The data elements shown in FIG. 2 have been provided to describe one example that can be implemented using the described technology.

In an example, after the first image is captured by the image capture component 204 the first image is stored in datastore 220. The object recognition model 224 is stored in the datastore 220 and stores data corresponding to the package to be delivered, the annotation on the first image, and trained data sets. Additionally, the parcel is positioned at the specific location, as indicated by the annotation, by identifying the parcel using the object recognition model 224. Then, a second image is automatically captured from the real-time image stream based on identifying the parcel is positioned at the specific location within the boundary marker.

For example, a delivery person utilizing a second computing device may capture a real-time image stream that comprises the annotation having a boundary marker indicating the specific desired delivery location. The annotated first image is overlaid within the real-time image stream based on comparing the first image received from the first computing device to the real-time image stream. By having the annotation overlaid with the real-time image stream, the delivery personal can align the second computing device with the desired delivery location within the annotation. For example, the first image captured by the image capturing component 204 may have an annotation that is a boundary marker appearing as a dashed box, indicating where at the delivery location the first user may want the parcel delivered. As such, when the delivery personal utilizes the second computing device, such as a mobile phone, to capture a real-time image via the real-time image capture component 206, the annotation of the specific location requested for delivery will appear overlaid over the real-time image stream based on comparison of the first image received from the first computing device to the real-time image stream.

Next, FIG. 3 illustrates an exemplary system architecture 300 of guidance engine 302. The guidance engine includes a location determiner 304, a navigation engine 306, and a guidance presentation component 308. Additionally, the example system architecture 300 also includes a data store 310, which includes an image location tag component 312. Utilizing the location determiner 304, navigation engine 306, and guidance presentation component 308, the guidance engine 302 provides guidance to the delivery personnel via the second computer device so that the parcel is delivered in exactly the correct location as requested by the first user.

Utilizing location based augmented reality, the location determiner 304 uses GPS sensors on the first computing entity, or another method of location determination by the second computing device as previously discussed, to determine the delivery location and the exact coordinates within the delivery location of the annotation. For example, based on GPS data, or other location determination information, received from the first computing device, the location determiner 304 will determine the address of the requested delivery location and the exact location within the delivery location that the first user indicated for delivery via the annotation. If the first delivery location was a front porch of a home, the location determiner 304 would determine the exact address of the home utilizing GPS data received from the first image. Additionally, the location determiner 304 would determine the location of the annotation within the first image and determine the exact location within the first image that the user has requested delivery. In other words, if the annotation on the first image is located on a bench located on the front porch of the example home, the location determiner will determine the precise location of the bench within the porch.

Based on the location determination by the location determiner 304, the navigation engine 306 will generate directions for the delivery personnel via the second device that include directions on how the delivery personnel can reach the assigned delivery location and place the parcel within the specified area requested by the first user.

The guidance presentation component 308 presents the directions generated by the navigation engine 306 to the delivery personnel on the second computing device. As shown in FIG. 7, the guidance presentation component 308 presents the guidance to the delivery personnel via the second computing device. In FIG. 7, the guidance presentation component delivers the instructions "move 4 ft to the left and 1 ft forward" and includes an arrow within the real-time image indicating where the delivery personnel needs to move in order to deliver the parcel in the location corresponding to the annotated boundary marker from the first image.

In addition to the guidance engine 302, the system architecture of FIG. 3 includes a datastore 310. The datastore 310 is configured to store image location tags 312. The image location tags are tags 312 assigned by the location determiner 304 that include the specific delivery location information such as the address of delivery, the metadata for the annotation on the first image, and any other location data.

Next, FIG. 5A illustrates a second computing device 405 taking a live video stream of the delivery location with the annotated first image of FIG. 4C overlaid onto the image. As shown in FIG. 5A, a real time image of the delivery location is shown. The delivery personnel, 403, is holding the second computing device 405 in front of the delivery location. Within the screen 407 of the second computing device 405, the overlaid delivery instructions from the first image can be seen. The annotated boundary marker 408 includes the text instructions 410. When the second computing device 405 is in the location that the first user indicated for delivery, the annotation overlay engine 210, presents the annotated first image on the second computing device 400. The image comparison component 212 compares the real-time image on seen by the camera on the second computing device 405 with the first image that was stored in the datastore 222 in order to compare the image location data to determine whether the deliver personnel is in the right location and to provide the annotated instructions for delivery. The overlay component 224 then overlays the annotated first image on top of the real-time image to show where the parcel should be delivered.

Once the second computing device 405 confirms the location of requested delivery matches the location where the second computing device 405 is, then the delivery personnel will place the parcel 416 onto the assigned location as seen in FIG. 5B. Once placed in the specific location, the delivery personnel 403 will take an image (automatically using methods described herein or by providing in input received by the second computing device that causes the second computing device to capture an image) of the parcel 416 delivered within the location of the boundary marker. As shown, the parcel 416 is located on porch 412 where the boundary marker 408 and written instructions directed the package to be delivered as discussed in FIG. 5A.

Then, as shown in FIG. 5C, the delivery personnel 403 will utilize the second computing device 405 to take an image of the delivered parcel. The second computing device 405 will capture the image shown within the boundary marker 416 by utilizing the capture 422 button. Within the image, the annotation from the first image is present and overlaid in order to show that the parcel 416 has been placed in the desired delivery location. Once the second computing device 405 captures the image showing that the parcel 416 has been delivered within the annotated area 408, a message may be generated to the first user indicating that the parcel has been delivered along with photo confirmation of the delivery.

Turning to FIGS. 6A-6B, the second computing device 405 is utilized to provide a zoomed in image of the parcel 416 at the delivery location. To further provide confirmation of the delivery, the second computing device 405 will scan a set of machine readable indicia 424 located on the parcel 416 that contains identifying information about the parcel. This information will be used to confirm that the package 416 matches the data stored regarding the delivery location for the first user. The machine readable indicia is usable by the second computing device 405 to determine a delivery location for the parcel and the second image is automatically captured from the real-time image stream based on the determined delivery location for the parcel matching the assigned delivery location associated with the first image. The object recognition model 224 of FIG. 2 will use stored data to match the data provided by the first user 403 to confirm that the delivery is made to the correct recipient. Once confirmed, the second computing device 405 will capture 422 the zoomed-in image of the parcel with the machine readable indicia 424 shown in FIG. 6B. This photo taken provides further confirmation of delivery of the parcel to the right location and can be transmitted to the first user via text message, email, or any other appropriate method. The machine readable indicia affixed to the parcel, is used by the second computing device 405 to determine a delivery location for the parcel, wherein the second image is automatically captured from the real-time image stream based on the determined delivery location for the parcel matching the assigned delivery location associated with the first image.

Next, FIG. 7 illustrates an example in which the delivery personnel receives guidance from the guidance engine 302. In this image, the second computing device 405 live streams an image of the delivery location 420. As shown, in addition to the boundary marker overlaid on the image 406 on the second computing device 403, the guidance engine 302, via the navigation engine 306, provides guidance to the delivery personnel on the exact location that the delivery personnel needs to be at in order to deliver the parcel in the location in the annotated first image. The guidance presentation component 308 presents guidance to the delivery personnel via a text box 432, in which the navigation engine 306 indicates that the delivery person should move 5 feet to the left and 1 foot forward in order to be in the location where the boundary marker 408 would match that of the first image. The location of the second computing device 405 is determined while the real-time image stream is captured. The second image is captured from the real-time data stream based on the location of the second computing device 405 relative to the assigned delivery location.

Guidance engine 302 may receive a first location of the first computing device that was determined at the time that the first image is captured by the location determiner 304. The location determiner 304 can also determine a second location of the second computing device 405 while the real-time image stream is captured. The guidance presentation component 308 presents guidance instructions from the second location of the second computing device 405 to the location of the annotated first image.

In some instances, the operations also comprise identifying that the parcel is positioned at the specific location, as indicated by the annotation, by identifying the parcel using an object recognition model, wherein the second image is automatically captured from the real-time image stream based on identifying the parcel is positioned at the specific location.

With reference now to FIGS. 8 and 9, flow diagrams are provided illustrating methods 500 and 600 for optimizing photo delivery and confirmation. Each block of methods 800 and 900, and any other methods described herein, comprise a computing process performed using any combination of hardware, firmware, or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

In FIG. 8, a method 800 for optimizing package delivery and confirmation is shown. The method begins with receiving an annotation indicating a specific location at an assigned delivery location for delivery of a parcel, the annotation being determined from a first image of the assigned delivery location captured by a first computing device, wherein the first image of the assigned delivery location is annotated at the first computing device at block 802. The first image was captured by the capture component 204 and then the annotation module 208 provided the annotation indicating the specific directions for the delivery.

Then, at 804, the system displays, at a display device of a second computing device 405, the annotation indicating the specific location and the annotation being overlaid on a real-time image stream captured by a camera of the second computing device 405, wherein the annotation indicates the assigned delivery location. The annotation overlay engine 210 is utilized by the second computing device 405 to overlay the annotated first image over a real-time image via the overlay component 216. Once overlaid, the annotated first image is presented via the annotation presentation component 218 on the second computing device, such as second computing device described in FIGS. 5A-5C.

After this, at block 806, the system captures, from the real-time image stream, a second image captured from the real-time image stream, the second image comprising the parcel positioned at the specific location based on the annotation overlaid within the real-time image stream. The real-time image capture component 206 captures the real-time image comprising the parcel delivered at the requested location. Additionally, while not shown in FIG. 8, the method may further include storing both the first annotated image and the second real-time image in a datastore such as datastore 220.

FIG. 9 illustrates another a method 900 for optimizing package delivery and confirmation. Beginning with block 902, a processor performing operations of a method for optimizing package delivery and confirmation begins with receiving a first image of an assigned delivery location captured by a first computing device, wherein the first image of the assigned delivery location comprises an annotation indicating a specific location at the assigned delivery location for delivery of a parcel. After this, at block 904, the method includes communicating, to a second computing device, the annotation indicating the specific location, wherein the annotation is overlaid on a real-time image stream captured by a camera of the second computing device and provided for display at a display device of the second computing device. Then, at block 906, the processor receives, from the second computing device, a second image captured from the real-time image stream by the second computing device, the second image comprising the parcel positioned at the specific location based on the annotation overlaid within the real-time image stream.

Having described an overview of the technology, along with various examples, an exemplary operating environment in which embodiments of the technology may be implemented is described below in order to provide a general context for various embodiments. Referring now to FIG. 10 in particular, an exemplary operating environment for implementing embodiments of the technology is shown and designated generally as computing device 1050. Computing device 1050 is but one example of a suitable computing environment and is not intended to suggest any limitation as to the scope of use or functionality of the technology. Neither should computing device 1050 be interpreted as having any dependency or requirement relating to any one or combination of components illustrated.

The technology may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 10, computing device 1050 includes bus 1060 that directly or indirectly couples the following devices: memory 1062, one or more processors 1064, one or more presentation components 1066, input/output (I/O) ports 1070, input/output components 1072, and illustrative power supply 1074. Bus 1060 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 10 is merely illustrative of an exemplary computing device that can be used in connection with one or more embodiments. Distinction is not made between such categories as "workstation," "server," "laptop," "hand-held device," etc., as all are contemplated within the scope of FIG. 12 and reference to "computing device."

Computing device 1050 typically includes a variety of computer-readable media. Computer-readable media can be any available media that can be accessed by computing device 1050 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1050. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1062 includes computer-storage media in the form of volatile or nonvolatile memory. The memory may be removable, non-removable, or a combination thereof. Example hardware devices include solid-state memory, hard drives, optical-disc drives, etc. Computing device 1050 includes one or more processors that read data from various entities such as memory 1062 or I/O components 1072. Presentation component(s) 1066 present data indications to a user or other device. Exemplary presentation components include a display device, speaker, printing component, vibrating component, etc.

I/O ports 1070 allow computing device 1050 to be logically coupled to other devices including I/O components 1018, some of which may be built in. Illustrative components include a microphone, joystick, game pad, satellite dish, scanner, printer, wireless device, etc. The I/O components 1072 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 1050. Computing device 1050 may be equipped with depth cameras, such as stereoscopic camera systems, infrared camera systems, RGB camera systems, touchscreen technology, and combinations of these, for gesture detection and recognition. Additionally, the computing device 1060 may be equipped with accelerometers or gyroscopes that enable detection of motion. The output of the accelerometers or gyroscopes may be provided to the display of computing device 1060 to render immersive augmented reality or virtual reality.

Embodiments described herein support system, media, and methods for image editing. The components described herein refer to integrated components of an image editing system. The integrated components refer to the hardware architecture and software framework that support functionality using the image editing system. The hardware architecture refers to physical components and interrelationships thereof and the software framework refers to software providing functionality that can be implemented with hardware embodied on a device.

The end-to-end software-based image editing system can operate within the image editing components to operate computer hardware to provide product recommendation system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low-level software written in machine code can provide more complex functionality to higher levels of software. As used herein, computer-executable instructions includes any software, including low-level software written in machine code, higher level software such as application software, and any combination thereof. In this regard, the image editing system components can manage resources and provide services for the image editing system functionality. Any other variations and combinations thereof are contemplated with embodiments of the present disclosure.

FIG. 11 provides an illustrative schematic representative of a mobile computing entity 1110 that can be used in conjunction with embodiments of the present invention. As will be recognized, mobile computing entities 1110 can be operated by various parties. As shown in FIG. 11, a mobile computing entity 1110 can include an antenna 1122, a transmitter 1104 (e.g., radio), a receiver 1106 (e.g., radio), and a processing element 1108 that provides signals to and receives signals from the transmitter 1104 and receiver 1106, respectively.

The signals provided to and received from the transmitter 1104 and the receiver 1106, respectively, may include signaling information/data in accordance with an air interface standard of applicable wireless systems to communicate with various entities. In this regard, the mobile computing entity 1110 may be capable of operating with one or more air interface standards, communication protocols, modulation types, and access types. More particularly, the mobile computing entity 1110 may operate in accordance with any of a number of wireless communication standards and protocols. In a particular embodiment, the mobile computing entity 1110 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile computing entity 1110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The mobile computing entity 1110 can also download changes, add-ons, and updates, for instance, to its firmware, software (e.g., including executable instructions, applications, program modules), and operating system.

According to one embodiment, the mobile computing entity 1110 may include location determining aspects, devices, modules, functionalities, and/or similar words used herein interchangeably. For example, the mobile computing entity 1110 may include outdoor positioning aspects, such as a location module adapted to acquire, for example, latitude, longitude, altitude, geocode, course, direction, heading, speed, UTC, date, and/or various other information/data. In one embodiment, the location module can acquire information/data, sometimes known as ephemeris information/data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the mobile computing entity's 1110 position in connection with a variety of other systems, including cellular towers, Wi-Fi access points, and/or the like. Similarly, the mobile computing entity 1110 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The mobile computing entity 1110 may also comprise a user interface (that can include a display 1116 coupled to a processing element 1108) and/or a user input interface (coupled to a processing element 1108). For example, the user interface may be an application, browser, user interface, dashboard, webpage, and/or similar words used herein interchangeably executing on and/or accessible via the mobile computing entity 1110 to interact with and/or cause display of information. The user input interface can comprise any of a number of devices allowing the mobile computing entity 1110 to receive information/data, such as a keypad 1118 (hard or soft), a touch display, voice/speech or motion interfaces, scanners, readers, or other input device. In embodiments including a keypad 1118, the keypad 1118 can include (or cause display of) the conventional numeric (0-9) and related keys (#, *), and other keys used for operating the mobile computing entity 1110 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the mobile computing entity can collect contextual information/data as part of the telematics information/data.

The mobile computing entity 1110 can also include volatile storage or memory 1122 and/or non-volatile storage or memory 1124, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store information/databases, information/database instances, information/database management system entities, information/data, applications, programs, program modules, scripts, source code, object code, byte code, compiled code, interpreted code, machine code, executable instructions, and/or the like to implement the functions of the mobile computing entity 1110.

Having identified various components in the present disclosure, it should be understood that any number of components and arrangements might be employed to achieve the desired functionality within the scope of the technology. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion, embodiments of the present technology described with reference to a distributed computing environment; however, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Some example aspects that can be practiced from the forgoing description include the following:

Aspect 1: A system for optimizing package delivery and confirmation, the system comprising: one or more processors; and one or more computer storage devices storing computer-useable instructions that, when executed by the one or more processors, cause the one or more processors to perform operations comprising: accessing a first image of an assigned delivery location captured by a first computing device, wherein the first image of the assigned delivery location comprises an annotation indicating a specific location at the assigned delivery location for delivery of a parcel; displaying, at a display device of a second computing device, a real-time image stream captured by a camera of the second computing device, wherein the real-time image stream comprises the annotation, the annotation being overlaid within the real-time image stream based on comparing the first image received from the first computing device to the real-time image stream; and capturing, from the real-time image stream, a second image when the parcel is positioned at the specific location based on the annotation overlaid within the real-time image stream.

Aspect 2: Aspect 1, wherein the operations further comprise determining a location of the second computing device while the real-time image stream is being captured, wherein the second image is captured from the real-time data stream based on the location of the second computing device relative to the assigned delivery location.

Aspect 3: Any of Aspects 1-2, the operations further comprise: receiving a first location of the first computing device determined at the time the first image is captured; determining a second location of the second computing device while the real-time image stream is being captured; and providing, at the display device of the second computing device, guidance instructions indicating a direction from the second location of the second computing device to the first location of the first computing device.

Aspect 4: Any of Aspects 1-3, wherein the operations further comprise identifying the parcel is positioned at the specific location, as indicated by the annotation, by identifying the parcel using an object recognition model, wherein the second image is automatically captured from the real-time image stream based on identifying the parcel is positioned at the specific location.

Aspect 5: Any of Aspects 1-4, wherein the operations further comprise identifying, at the specific location, as indicated by the annotation, machine readable indicia affixed to the parcel, the machine readable indicia being usable by the second computing device to determine a delivery location for the parcel, wherein the second image is automatically captured from the real-time image stream based on the determined delivery location for the parcel matching the assigned delivery location associated with the first image.

Aspect 6: Any of Aspects 1-5, wherein the first image received from the first computing device is compared to the real-time image stream using a convolutional neural network.

Aspect 7: Any of Aspects 1-6, wherein the annotation comprises a boundary marker, the boundary marker delineating the specific location at the assigned delivery location, and wherein the second image is captured from the real-time image stream when the parcel is positioned within the boundary marker.

Aspect 8: Any of the Aspects 1-7, wherein the annotation comprises human readable text.

Aspect 9: A computer implemented method for optimizing package delivery and confirmation, the method comprising: receiving an annotation indicating a specific location at an assigned delivery location for delivery of a parcel, the annotation being determined from a first image of the assigned delivery location captured by a first computing device, wherein the first image of the assigned delivery location is annotated at the first computing device; displaying, at a display device of a second computing device, the annotation indicating the specific location, the annotation being overlaid on a real-time image stream captured by a camera of the second computing device, wherein the annotation indicates the assigned delivery location; and capturing, from the real-time image stream, a second image captured from the real-time image stream, the second image comprising the parcel positioned at the specific location based on the annotation overlaid within the real-time image stream.

Aspect 10: Any of the Aspect 9, further comprising determining a location of the second computing device while the real-time image stream is being captured, wherein the second image is captured from the real-time data stream based on the location of the second computing device relative to the assigned delivery location.

Aspect 11: Any of the Aspects 9-10, further comprising receiving a first location of the first computing device determined at the time the first image is captured; determining a second location of the second computing device while the real-time image stream is being captured; and providing, at the display device of the second computing device, guidance instructions indicating a direction from the second location of the second computing device to the first location of the first computing device.

Aspect 12: Any of the Aspects 9-11, further comprising identifying the parcel is positioned at the specific location, as indicated by the annotation, by identifying the parcel using an object recognition model, wherein the second image is automatically captured from the real-time image stream based on identifying the parcel is positioned at the specific location.

Aspect 13: Any of Aspects 9-12, further comprising wherein the object recognition model is a convolutional neural network trained to identify parcels.

Aspect 14: Any of Aspects 9-13, further comprising identifying, at the specific location, as indicated by the annotation, machine readable indicia affixed to the parcel, the machine readable indicia being usable by the second computing device to determine a delivery location for the parcel, wherein the second image is automatically captured from the real-time image stream based on the determined delivery location for the parcel matching the assigned delivery location associated with the first image.

Aspect 15: Any of Aspects 9-14, wherein the annotation comprises a boundary marker, the boundary marker delineating the specific location at the assigned delivery location, and wherein the second image is captured from the real-time image stream when the parcel is positioned within the boundary marker.

Aspect 16: Any of Aspects 9-15, further comprising detecting the parcel is positioned within the boundary marker using an object recognition model, wherein the second image is automatically captured in response to detecting the parcel is positioned within the boundary marker.

Aspect 17: Any of Aspects 9-16, wherein the annotation comprises human readable text.

Aspect 18: One or more computer storage media storing computer readable instructions thereon that, when executed by a processor, cause the processor to perform operations of a method for optimizing package delivery and confirmation, the operations comprising: receiving a first image of an assigned delivery location captured by a first computing device, wherein the first image of the assigned delivery location comprises an annotation indicating a specific location at the assigned delivery location for delivery of a parcel; communicating, to a second computing device, the annotation indicating the specific location, wherein the annotation is overlaid on a real-time image stream captured by a camera of the second computing device and provided for display at a display device of the second computing device; and receiving, from the second computing device, a second image captured from the real-time image stream by the second computing device, the second image comprising the parcel positioned at the specific location based on the annotation overlaid within the real-time image stream.

Aspect 19: Aspect 18, wherein the annotation comprises a boundary marker, the boundary marker delineating the specific location at the assigned delivery location, and wherein the second image is captured from the real-time image stream when the parcel is positioned within the boundary marker.

Aspect 20: Any of Aspects 18-19, wherein the annotation comprises human readable text.

What is claimed is:

1. A system for optimizing package delivery and confirmation, the system comprising:
   one or more processors; and
   one or more computer storage devices storing computer-useable instructions that, when executed by the one or more processors, cause the one or more processors to perform operations comprising:
   accessing a first image of an assigned delivery location captured by a first computing device, wherein the first image of the assigned delivery location comprises an annotation indicating a specific location at the assigned delivery location for delivery of a parcel;
   displaying, at a display device of a second computing device, a real-time image stream captured by a camera of the second computing device, wherein the real-time image stream comprises the annotation, the annotation being overlaid within the real-time image stream based on comparing the first image received from the first computing device to the real-time image stream; and
   capturing, from the real-time image stream, a second image when the parcel is positioned at the specific location based on the annotation overlaid within the real-time image stream.

2. The system of claim 1, wherein the operations further comprise determining a location of the second computing device while the real-time image stream is being captured, wherein the second image is captured from the real-time data stream based on the location of the second computing device relative to the assigned delivery location.

3. The system of claim 1, wherein the operations further comprise:
   receiving a first location of the first computing device determined at the time the first image is captured;
   determining a second location of the second computing device while the real-time image stream is being captured; and
   providing, at the display device of the second computing device, guidance instructions indicating a direction from the second location of the second computing device to the first location of the first computing device.

4. The system of claim 1, wherein the operations further comprise identifying the parcel is positioned at the specific location, as indicated by the annotation, by identifying the parcel using an object recognition model, wherein the second image is automatically captured from the real-time image stream based on identifying the parcel is positioned at the specific location.

5. The system of claim 1, wherein the operations further comprise identifying, at the specific location, as indicated by the annotation, machine readable indicia affixed to the parcel, the machine readable indicia being usable by the second computing device to determine a delivery location for the parcel, wherein the second image is automatically captured from the real-time image stream based on the determined delivery location for the parcel matching the assigned delivery location associated with the first image.

6. The system of claim 1, wherein the first image received from the first computing device is compared to the real-time image stream using a convolutional neural network.

7. The system of claim 1, wherein the annotation comprises a boundary marker, the boundary marker delineating the specific location at the assigned delivery location, and wherein the second image is captured from the real-time image stream when the parcel is positioned within the boundary marker.

8. The system of claim 1, wherein the annotation comprises human readable text.

9. A computer implemented method for optimizing package delivery and confirmation, the method comprising:
   receiving an annotation indicating a specific location at an assigned delivery location for delivery of a parcel, the annotation being determined from a first image of the assigned delivery location captured by a first computing device, wherein the first image of the assigned delivery location is annotated at the first computing device;
   displaying, at a display device of a second computing device, the annotation indicating the specific location, the annotation being overlaid on a real-time image stream captured by a camera of the second computing device, wherein the annotation indicates the assigned delivery location; and
   capturing, from the real-time image stream, a second image from the real-time image stream, the second image comprising the parcel positioned at the specific location based on the annotation overlaid within the real-time image stream.

10. The method of claim 9, further comprising determining a location of the second computing device while the real-time image stream is being captured, wherein the second image is captured from the real-time data stream based on the location of the second computing device relative to the assigned delivery location.

11. The method of claim 9, further comprising:
    receiving a first location of the first computing device determined at the time the first image is captured;
    determining a second location of the second computing device while the real-time image stream is being captured; and
    providing, at the display device of the second computing device, guidance instructions indicating a direction from the second location of the second computing device to the first location of the first computing device.

12. The method of claim 9, further comprising identifying the parcel is positioned at the specific location, as indicated by the annotation, by identifying the parcel using an object recognition model, wherein the second image is automatically captured from the real-time image stream based on identifying the parcel is positioned at the specific location.

13. The method of claim 12, wherein the object recognition model is a convolutional neural network trained to identify parcels.

14. The method of claim 9, further comprising identifying, at the specific location, as indicated by the annotation, machine readable indicia affixed to the parcel, the machine readable indicia being usable by the second computing device to determine a delivery location for the parcel, wherein the second image is automatically captured from the real-time image stream based on the determined delivery location for the parcel matching the assigned delivery location associated with the first image.

15. The method of claim 9, wherein the annotation comprises a boundary marker, the boundary marker delineating the specific location at the assigned delivery location, and wherein the second image is captured from the real-time image stream when the parcel is positioned within the boundary marker.

16. The method of claim 15, further comprising detecting the parcel is positioned within the boundary marker using an object recognition model, wherein the second image is automatically captured in response to detecting the parcel is positioned within the boundary marker.

17. The method of claim 9, wherein the annotation comprises human readable text.

18. One or more non-transitory computer storage media storing computer readable instructions thereon that, when executed by a processor, cause the processor to perform operations of a method for optimizing package delivery and confirmation, the operations comprising:

receiving a first image of an assigned delivery location captured by a first computing device, wherein the first image of the assigned delivery location comprises an annotation indicating a specific location at the assigned delivery location for delivery of a parcel;

communicating, to a second computing device, the annotation indicating the specific location, wherein the annotation is overlaid on a real-time image stream captured by a camera of the second computing device and provided for display at a display device of the second computing device; and receiving, from the second computing device, a second image captured from the real-time image stream by the second computing device, the second image comprising the parcel positioned at the specific location based on the annotation overlaid within the real-time image stream.

19. The non-transitory computer storage media of claim 18, wherein the annotation comprises a boundary marker, the boundary marker delineating the specific location at the assigned delivery location, and wherein the second image is captured from the real-time image stream when the parcel is positioned within the boundary marker.

20. The non-transitory computer storage media of claim 18, wherein the annotation comprises human readable text.

* * * * *